(12) United States Patent
Sprehe et al.

(10) Patent No.: US 8,353,147 B2
(45) Date of Patent: Jan. 15, 2013

(54) APPARATUS AND METHOD FOR MANUFACTURE OF A TOP OPENING RECLOSABLE BAG HAVING A TAPE FORMED RECLOSABLE SEAL

(76) Inventors: Gregory S. Sprehe, Carterville, IL (US); William A. Bodolay, Chicago, IL (US); Robert Beiser, legal representative, Chicago, IL (US); Donald Wright, Murphysboro, IL (US); Christopher Pemberton, Marion, IL (US); Lester Siebert, Cobden, IL (US)

( * ) Notice: Subject to any disclaimer, the term of this patent is extended or adjusted under 35 U.S.C. 154(b) by 520 days.

(21) Appl. No.: 12/507,243

(22) Filed: Jul. 22, 2009

(65) Prior Publication Data

US 2010/0061666 A1 Mar. 11, 2010

Related U.S. Application Data

(60) Continuation-in-part of application No. 10/788,093, filed on Feb. 26, 2004, now abandoned, which is a division of application No. 09/660,210, filed on Sep. 12, 2000, now Pat. No. 6,726,612, which is a division of application No. 09/257,560, filed on Feb. 25, 1999, now Pat. No. 6,117,060, which is a continuation-in-part of application No. 09/118,575, filed on Jul. 17, 1998, now Pat. No. 6,098,369.

(51) Int. Cl.
*B65B 9/08* (2006.01)

(52) U.S. Cl. ............... 53/551; 53/451; 53/550; 53/575; 53/133.4

(58) Field of Classification Search .............. 53/450, 53/451, 452, 453, 554, 52, 55, 64, 51, 545, 53/550, 551, 553, 574, 575
See application file for complete search history.

(56) References Cited

U.S. PATENT DOCUMENTS

| | | | |
|---|---|---|---|
| 2,978,769 A | 4/1961 | Harrah | |
| 3,266,965 A | 8/1966 | Spees | |
| 3,948,705 A | 4/1976 | Ausnit | |
| 4,233,331 A | 11/1980 | Lemke et al. | |
| 4,288,965 A * | 9/1981 | James | 53/451 |
| 4,384,915 A | 5/1983 | Utsumi | |
| 4,391,081 A * | 7/1983 | Kovacs | 53/436 |
| 4,534,159 A * | 8/1985 | Kelly | 53/552 |
| 4,548,018 A | 10/1985 | Wojnicki | |
| 4,601,694 A | 7/1986 | Ausnit | |
| 4,605,459 A | 8/1986 | Voitmer | |
| 4,691,373 A | 9/1987 | Ausnit | |
| 4,786,190 A | 11/1988 | Van Erden | |
| 4,881,932 A | 11/1989 | Blatt | |
| 4,923,309 A | 5/1990 | Van Erden | |
| 5,024,537 A | 6/1991 | Tilman | |
| 5,024,645 A | 6/1991 | Soubrier et al. | |

(Continued)

*Primary Examiner* — Christopher Harmon

(57) ABSTRACT

A vertical form, fill and seal machine in conjunction with a product supply apparatus provides a continuous, heat sealable plastic film and zipper tape and provides separate, product filled, reclosable, top opening sealed bags. The apparatus includes a means for supplying the continuous plastic film, a means for supplying zipper tape, a means for sealing the zipper tape sections to the film, a vertical fill tube assembly, a feeding means including a film drive roll upstream, film pull belts adjacent the vertical fill tube, a vertical sealing means for sealing the edges of the continuous film to the edges of the continuous zippered cap strip, a horizontal sealing, perforating, and severing means for severing the plastic tube between the first and second horizontal seals, and a tensioning means for horizontally elongating the flexible plastic tube transverse to its length prior to formation of the horizontal seals.

10 Claims, 15 Drawing Sheets

U.S. PATENT DOCUMENTS

| | | | | |
|---|---|---|---|---|
| 5,036,643 A | | 8/1991 | Bodolay | |
| 5,038,550 A | * | 8/1991 | Wirsig et al. | 53/451 |
| 5,065,899 A | | 11/1991 | Tilman | |
| 5,076,038 A | | 12/1991 | Costa | |
| 5,088,971 A | | 2/1992 | Herrington | |
| 5,461,845 A | | 10/1995 | Yeager | |
| 5,519,982 A | | 5/1996 | Herber et al. | |
| 5,573,614 A | | 11/1996 | Tilman et al. | |
| 5,601,368 A | | 2/1997 | Bodolay et al. | |
| 5,672,009 A | | 9/1997 | Malin | |
| 5,768,852 A | * | 6/1998 | Terminella et al. | 53/133.4 |
| 5,776,045 A | | 7/1998 | Bodolay et al. | |
| 5,782,733 A | | 7/1998 | Yeager | |
| 5,823,933 A | | 10/1998 | Yeager | |
| 5,833,791 A | | 11/1998 | Bryniarski | |
| 5,902,047 A | | 5/1999 | Yeager | |
| 5,951,453 A | | 9/1999 | Yeager | |
| 6,047,521 A | * | 4/2000 | Terminella et al. | 53/133.4 |
| 6,088,998 A | * | 7/2000 | Malin et al. | 53/416 |
| 6,098,369 A | | 8/2000 | Bodolay | |
| 6,117,060 A | | 9/2000 | Bodolay | |
| 6,151,868 A | * | 11/2000 | Matthews | 53/451 |
| 6,212,857 B1 | | 4/2001 | Van Erden | |
| 6,461,043 B1 | | 10/2002 | Healy et al. | |
| 6,553,744 B1 | * | 4/2003 | Terminella et al. | 53/551 |
| 6,581,358 B2 | | 6/2003 | Buchman | |
| 6,656,297 B2 | | 12/2003 | Schneider | |
| 6,709,157 B2 | | 3/2004 | VandenHeuvel | |
| 6,770,018 B2 | | 8/2004 | Tomic | |
| 6,792,740 B2 | | 9/2004 | Buchman | |
| 7,325,378 B2 | * | 2/2008 | Ausnit | 53/412 |
| 7,490,451 B2 | * | 2/2009 | Matthews | 53/412 |

* cited by examiner

APPARATUS AND METHOD FOR MANUFACTURE OF A TOP OPENING RECLOSABLE BAG HAVING A TAPE FORMED RECLOSABLE SEAL

CROSS-REFERENCE TO RELATED APPLICATIONS

The present application is a Continuation-in-Part of U.S. patent application Ser. No. 10/788,093, filed Feb. 26, 2004 Now abandoned entitled CONTINUOUS SUPPLY OF PREFORMED RECLOSABLE FASTENERS, which is a division of U.S. patent application Ser. No. 09/660,210, filed Sep. 12, 2000, now U.S. Pat. No. 6,726,612, which is a division of U.S. patent application Ser. No. 09/257,560, filed Feb. 25, 1999, now U.S. Pat. No. 6,117, 060, which is a Continuation-in-Part of U.S. patent application Ser. No. 09/118,575, filed Jul. 17, 1998, now U.S. Pat. No. 6,098,369.

BACKGROUND

1. Field of the Disclosure

This disclosure generally relates to reclosable plastic bags, and a method of their manufacture that is more efficient and economical than conventional methods and devices. The present disclosure also relates generally to a continuous supply of preformed reclosable fasteners used in an apparatus for attaching a reclosable fastener to a flexible web of material. More particularly, the supply of preformed fasteners of this disclosure may be operatively attached to a conventional form, fill, seal and separate packaging machine in a manner that enables the packaging machine to produce high quality reclosable packages without interfering with the ordinary operation of the packaging machine, using the apparatus of the above-referenced co-pending application.

2. Description of the Prior Art

Reclosable containers utilizing zipper-type fasteners are well known in the packaging industry and are used for holding, displaying and dispensing a wide variety of products ranging from hardware items to food products intended for human consumption. With the increasing consumer preference for reclosable zipper-type plastic bags, there have been continual efforts to develop packaging machines for producing such is reclosable packages. This is especially true at the retail level for the sale of prepackaged convenience items such as, for example, food products.

As is also well known in the field of flexible packaging, there presently exist numerous machines for automatically forming, filling and sealing materials in flexible containers. As a result of consumer enthusiasm toward reclosable plastic containers, the packaging industry has sought to develop packaging machines for automatically forming, filling and sealing such reclosable containers. For example, U.S. Pat. No. 5,036,643 discloses a form, fill, seal and separate packaging machine with a means to apply a reclosable zipper to a web of material. However, the means for applying the zipper-type closure to the flexible web is incorporated within the packaging machine. Manufacturers currently utilizing conventional packaging machines are often unable to justify the costs involved with replacing existing machines with one such as disclosed in that '643 patent.

It is, therefore, clear that there remains a great need in the art for a suitable apparatus for attaching a zipper-type closure to a flexible material in a fashion that is particularly adapted to cooperate with existing conventional packaging machines, thus eliminating the requirement for total replacement of present-day packaging machines. In addition, such an apparatus should be capable of adjustment in order to accommodate the manufacture of reclosable packages of various sizes and weight content. Furthermore, such an apparatus should operate in a fashion so that it will not significantly affect the ordinary operation and installation of conventional form, fill, seal and separate packaging machines to which the apparatus would be attached.

Just as apparent is the need for a supply of reclosable fasteners suitable for use in such an apparatus. Such a supply must provide fasteners to the apparatus in a manner so that the fasteners may be efficiently and properly attached to permit forming a secure and reliable reclosable package.

One type of reclosable bag for use as such a reclosable package is illustrated in U.S. Pat. No. 5,461,845 to Yeager ("Yeager '845 patent"). There are at least two definitive shortcomings with the technology described therein. The first shortcoming relates to the problem of having to open the zipper completely from the front panel of the finished bag. Users of reclosable bags and packaging are accustomed to opening the profiled fastener from the "top" of the package, and not from the front panel of the package. Hence, the user will have to become accustomed to an unfamiliar or uncomfortable manner in which to open a bag.

The second shortcoming is more serious, and relates to the requirement of opening the package from the front panel thereof. If the package is to be opened from the front panel, a cut or perforation must be made before the fastener is applied. This cut, or perforation, is generally shaped like an "oval" with opening "tabs" for gaining access to the fastener. Since the fastener, most likely, is not closed at the ends of the fastener, the possibility of contamination exists.

The most expedient and economical way to make the package is to create the cut, or perforation, in one operation, just upstream of the fastener strip application. This operation, in its simplest form, will leave openings for potential contamination to pass through the cut or perforated front panel opening. To overcome this contamination potential, users of this method add a great deal more cost and complexity to create a sealed, sealable "patch", or some other means of eliminating this contamination risk. The same problem occurs, if the package must be hermetically sealed.

Another example of the prior art includes U.S. Pat. No. 4,909,017 to McMahon ("McMahon '017 patent"). A particular problem with the McMahon '017 technique is that one obtains a naturally curled thin strip fastener that ultimately makes the fastener unstable, and irregularly shaped. In addition to the problem of sealing the backside of this unstable, irregular-shaped strip fastener to the bag wall(s), there is the problem of keeping the material from naturally curling after sealing the strip to a bag wall, making it even more difficult to get a uniform seal on the backside of the fastener strip.

Hence, there exists a need to solve the problems in the art that are articulated above.

SUMMARY OF THE DISCLOSURE

This disclosure generally relates to reclosable plastic bags, and a method of their manufacture that is more efficient and economical than conventional methods and devices.

The present disclosure relates to a continuous supply of preformed reclosable fasteners used in combination with an apparatus for attaching a reclosable zipper-type fastener to a flexible material primarily intended for use with a host form, fill, seal and separate packaging machine. More specifically, the continuous supply of preformed reclosable fasteners is used in combination with the apparatus of the disclosure of the above-referenced co-pending application, that apparatus being adapted for use with virtually any conventional host packaging machine without the necessity of major modification or adjustment to the existing machine or its normal manner of operation.

In the present disclosure, the apparatus used to attach the preformed reclosable fasteners to the web from which the packages are made is operatively attached to the host packaging machine and driven by at least one programmable motor and function controller in cooperative relation with the host machine. The web of flexible material from which the host machine will ultimately form packages is directed along a first path of the apparatus by guide rollers, and a punch, or other such similar cutting device, positioned along the first path of travel makes at least one cut through a predetermined segment of the web to form a removable/rupturable portion of flexible material that will ultimately provide both convenient and tamper-evident access to the reclosable fastener of the finished container. While movement of the web along the first path is driven by the host machine, intermittent movement of the web along the first path is controlled by a web position detector disposed along that first path and operatively connected to the programmable motor and function controller, for detection of the web of flexible material at predetermined intervals. The actual position of the cutting punch along the first path is adjustable dependent upon the size of the finished container to be made by the host machine.

The apparatus further comprises means for guiding the supply of preformed reclosable zipper-type fasteners along a second path of travel through the apparatus by the programmable motor and function controller. Disposed downstream from the primary supply of reclosable fasteners at what may be termed the distal end of the second path of travel is a pusher for engaging an individual one of the fastener strips to index the fasteners along the second path to means for transferring individual fastener strips into juxtaposition with the segment of the flexible material for sealing in overlying relation to the cut made therein.

In an embodiment of the present disclosure, the supply of reclosable zipper-type fasteners comprises a roll of fasteners, with adjacent ones attached to each other at their respective fused ends such that the sealing strips are disposed in substantially transverse relation to the direction of travel of the second path through the apparatus. Just downstream from the pusher, a separator, preferably defined by a pair of knives, detaches an individual one of the fastener strips from the supply, and the detached strip is placed within a corresponding one of a plurality of strip receivers formed on the surface of a transfer drum. The individual strips are retained within their corresponding strip receiver, and, in the embodiment, the programmable motor intermittently rotates the transfer drum in response to signals received from the function controller so as to dispose one of the strip receivers and the detached strip held therein into juxtaposition with one of the cuts formed in the web of flexible material. Means are provided for releasing the strip from its retainer and, then, for sealing the strip to the flexible web.

The flexible web having reclosable zipper-type fasteners sealed thereto is then passed to the host machine for forming, filling, sealing and separating reclosable containers therefrom.

The embodiments accordingly comprise the features of construction, combination of elements, and arrangement of parts which will be exemplified in the construction hereinafter set forth, and the scope of the disclosure will be indicated in the claims.

Further, it is an object of the disclosure to overcome the shortcomings of the prior art by providing a reclosable back-seam bag that provides a hermetic seal by sealing a bag body with a top seal, a bottom seal, a back seam seal, and a plurality of seals sealing a reclosable fastener with flanges to a front wall and a back wall of the bag body.

It is a further object of the disclosure to provide a reclosable bag having a reclosable fastener assembly that includes two ends, a first continuous elongated profile strip and a second continuous elongated profile strip. The first continuous elongated profile and the second continuous elongated profile provides an airtight and/or watertight seal upon interconnection thereof.

It is yet a further object of the disclosure to provide an airtight and/or watertight side seal at each end of the reclosable fastener assembly. Each of the side seals connects an end of the reclosable fastener assembly to an inside surface of the front wall and an inside surface of the back wall of the bag.

It is another object of the disclosure to provide a continuous airtight and watertight lower seal along the length of the reclosable fastener assembly positioned below the profiles. The lower seal connects the reclosable fastener assembly to the front wall. Yet another continuous airtight and watertight upper seal is provided along the length of the reclosable fastener assembly and positioned above the profiles. The upper seal connects the reclosable fastener assembly to the back wall of the bag body.

Another object of the disclosure is to provide a bag with a first continuous elongated profile strip that has a front wall connecting flange and a gripping flange. Both the front wall connecting flange and the gripping flange have a width greater than a width of the first continuous elongated profile strip to assist in positioning and sealing of the reclosable fastener to web stock. The front wall-connecting flange is sealed to the front wall of the bag.

The disclosure further provides a bag with a second continuous elongated profile strip that has a back wall-connecting flange. The back wall connecting flange has a width greater than a width of the second continuous elongated profile strip so that the back wall connecting flange can be easily sealed to the back wall. The length of the reclosable fastener assembly is less than the width of the back wall of the bag to provide ease of sealing of the side seals of the bag.

It is a further object of the disclosure to provide a frangible access that is substantially parallel to the reclosable fastener assembly. Upon opening, the frangible access exposes the reclosable fastener assembly. The frangible access is located on the front wall and on the back wall of the bag body adjacent the reclosable fastener assembly and above the upper seal.

It is yet another object of the disclosure to provide a reclosable back-seam bag in which the first continuous elongated profile strip and the second continuous elongated profile strip each have respective back portions. The back portions can move in relation to the inside surface of the rectangular sheet and thus provide the bag with greater flexibility and tear resistance.

It is a further object of the disclosure to provide a reclosable back-seam bag having a gripping flange that includes a continuous rib located at a distal end of the gripping flange and/or a plurality of continuous, substantially parallel ribs located on the gripping flange. The ribs and the gripping flange provide a user with ease of opening of the reclosable fastener once the frangible access has been opened.

Yet another object of the disclosure is to provide a method of making a reclosable back-seam bag. The method includes the steps of providing a rectangular sheet of polymeric material having an inside surface. A predetermined length of a reclosable fastener including two ends, and a first continuous elongated profile strip interlocked with a second continuous elongated profile strip is provided, and a front wall connecting flange of the reclosable fastener is connected to the inside surface of the rectangular sheet.

The method includes the step of forming a bag body having a front wall and a back wall. The back wall is formed by folding the rectangular sheet of film along two longitudinal folds, and overlapping and sealing edges of the rectangular sheet.

The method further includes joining the front wall to the back wall at a bottom seal, and connecting a back wall connecting flange to the inside surface of the rectangular sheet and the back wall of the bag at a back wall connecting seal. Each end of the reclosable fastener is sealed to the inside surface of the rectangular sheet of film inwardly of the longitudinal folds of the bag body thereby preventing air or liquids from entering or leaving the bag through the ends of the reclosable fastener. A frangible access substantially parallel to the reclosable fastener being located on the front wall and on the back wall of the bag body adjacent the reclosable fastener and above the back wall connecting seal is provided for exposing the reclosable fastener. The method also includes providing a top seal above the frangible access.

Yet another object of the disclosure is to provide a method of making a reclosable bag that includes splotching and substantially flattening the ends of the reclosable fastener prior to the step of connecting the front wall connecting flange to the inside surface of the rectangular sheet. In a variant of the embodiments it is also appreciated that the ends can be flattened by compression molding the ends into the desired shape with or without the use of heat or ultrasonic sealing. Further the flattened ends and/or the bag body can have marks or other machine readable indicia thereon to permit an electric eye or the like to read the marks or indicia and achieve proper registration and alignment of the reclosable fastener with the bag body.

It is yet another object of the present disclosure to allow the customer/user of the package to open the package from the top, as he or she is accustomed.

It is another object of this disclosure to overcome the shortcomings of the art by using flanged reclosable fasteners in the bag forming process, and requiring that the operations for making the bag involve sealing two flat, substantially parallel thin surfaces. There is no irregular surface that is sealed to attach the fastener to the front panel, or to carry the fastener through the bagger and down the form, fill and seal tube, or to seal the back-seamed side of the package.

It is an additional object of the disclosure to have the flanges of the reclosable fastener sized and dimensioned to prevent the flanges from being sealed to the wrong bag wall as described below.

It is a further object of the disclosure to provide an automatic contamination-free package by sealing the fastener completely inside the package, and providing a hermetically sealed space within the bag body with an airtight and watertight reclosable fastener seal and other bag body seals. In this variant, the package is opened at the perforations of the package to allow the customer/user to get to the gripping flange of the fastener.

It is another object of the present disclosure to solve these and other problems in the art, and to serve a market that demands hundreds of millions of reclosable plastic bags annually.

One embodiment provides an apparatus for attaching a reclosable zipper-type fastener to a flexible material primarily intended for use with a host form, fill, seal and separate packaging machine to form a top-opening reclosable container. The apparatus comprises a means for supplying a flexible material to the apparatus, a programmable motor and a function controller operatively connected to each other for driving the apparatus, a means for guiding the flexible material along a first path through the apparatus, a punch that forms at least one cut through a predetermined segment of the flexible material, where the punch is disposed along the first path and operatively connected to the controller, a means for supplying a plurality of reclosable zipper-type fasteners to the apparatus, where each one of the fasteners has fused opposed distal ends and is joined to an adjacent fastener at the fused opposed distal ends, a means for guiding the fasteners along a second path through the apparatus, a means for transferring individual fasteners from the second path to a position substantially adjacent the first path in juxtaposed relation to the cut, where the means for transferring is disposed along the second path and is driven by the motor, and a means for sealing a fastener to the flexible material in overlying relation to the cut in response to a signal received from the controller means for sealing the zipper tape to both the front wall and the back wall of the bag so as to form a top seal at the top of each of the bags, and a means for horizontally perforating the film above the zipper tape in the bag and below the top seal.

Another embodiment provides a vertical form, fill and seal machine of the type that operates in conjunction with a product supply apparatus providing product in discrete quantities and that forms a continuous, heat sealable plastic film and zipper tape into separate, product filled, reclosable, top opening sealed bags comprising: a means for supplying the continuous plastic film, a means for transversely supplying sections of the zipper tape, a means for sealing the zipper tape sections to the film, a vertical fill tube assembly including a forming collar and a fill tube downstream of the means for supplying the continuous film and zippered tape sections, a feeding means including a film drive roll upstream of the vertical fill tube, a pair of film pull belts adjacent the vertical fill tube, a vertical sealing means for sealing the edges of the continuous film to the edges of the continuous zippered cap strip to form a flexible plastic tube, a horizontal sealing, perforating, and severing means downstream of the vertical fill tube for forming first and second horizontal seals across the flexible plastic tube and for severing the plastic tube between the first and second horizontal seals, and a tensioning means for horizontally elongating the flexible plastic tube transverse to its length prior to formation of the horizontal seals. The horizontal sealing and severing means may also include a horizontal pinch seal mechanism.

The objects and features of the present disclosure, other than those specifically set forth above, will become apparent in the detailed description of the embodiments set forth below and in the drawings.

BRIEF DESCRIPTION OF THE DRAWINGS

For a fuller understanding of the nature and objects of the disclosure, reference should be had to the following detailed description taken in connection with the accompanying drawings, in which.

Similar reference characters refer to similar parts throughout the several views of the drawings.

DETAILED DESCRIPTION

Figure 1:
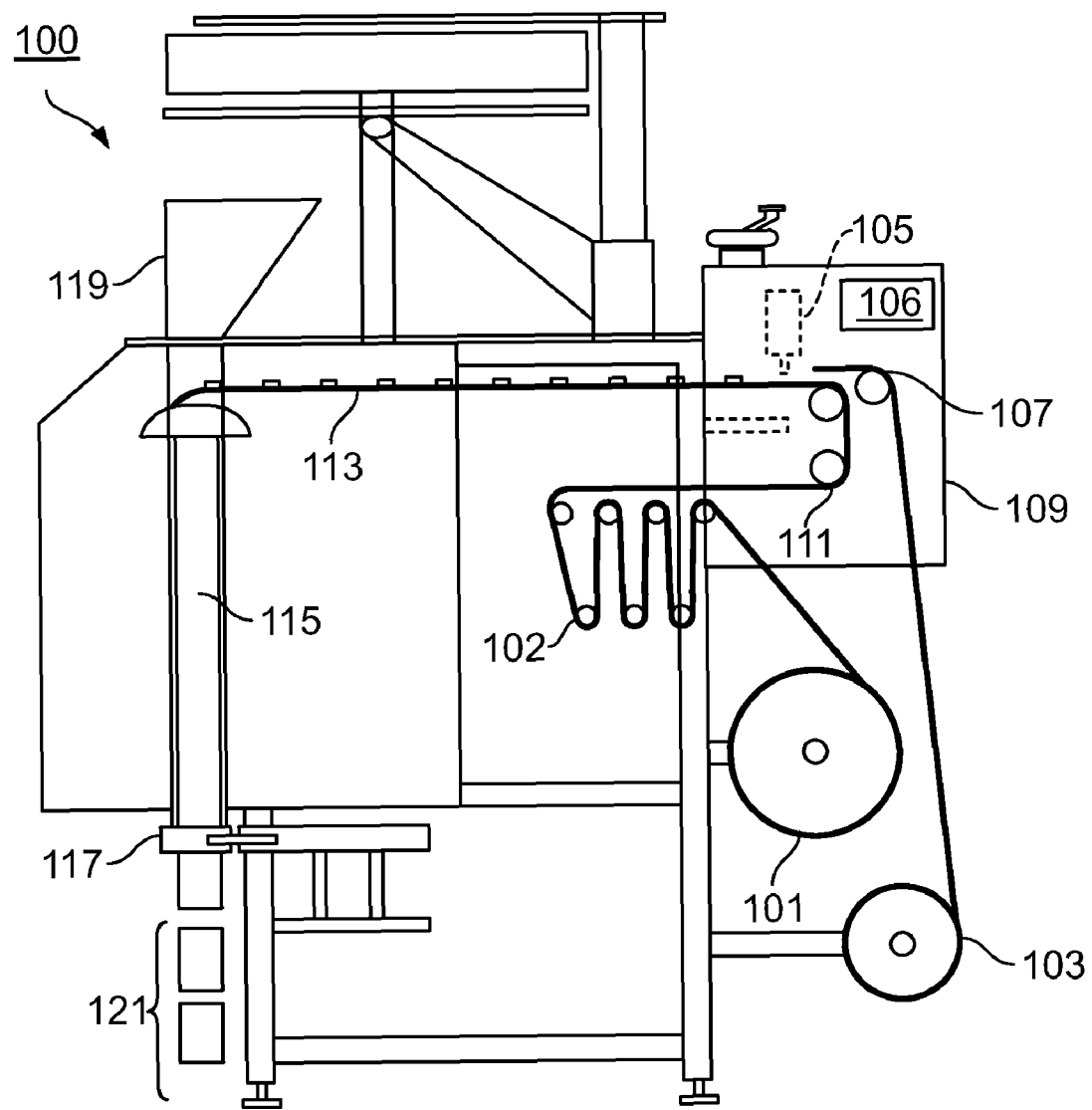
FIG. 1 is a side elevation view of a vertical form fill and seal machine having a zipper type fastener attachment mechanism and other features in accordance with the embodiments.

FIG. 1 illustrates an apparatus in accordance with the embodiments wherein a supply of preformed fasteners may be operatively attached to a conventional form, fill, seal and separate packaging machine 100. In one embodiment, a roll of a reclosable zipper-type fasteners 103 is provided along with a roll of flexible material, that is a plastic web or film roll 101. The flexible material is supplied by, for example, a programmable motor and a function controller 106 contained within a housing 109 (which may also be retrofit to a form, fill, seal and separate packaging machine), and operatively connected to each other for driving the apparatus. The flexible material may be guided along a first path through the apparatus by guide rollers 102, or any other suitable guide mechanism. The zipper fasteners from zipper fastener roll 103 are similarly guided through the apparatus via, for example, a guide roller 107, and the zipper fasteners and flexible web are placed in position with a sealing mechanism 105. The sealing mechanism 105, which may be a pressure and heat type seal mechanism, applies the zipper fastener from zipper fastener roll 103 to the flexible web from flexible web roll 101, which may be further tensioned and placed in position by guides 111. All of the above described operation is performed via the function controller 106 and programmable motor, which may be a servo motor, and various servo controls that are integrated with, or separate from, the function controller 106 and/or the servo motor, however all such devices are operatively connected to, and operated under supervision of, the function controller 106. For example, the sealing mechanism 105 will operate to attach the zipper fastener to the web material in response to a signal from the function controller 106.

The flexible web having the zipper fasteners attached 113, subsequently moves downstream to a fill tube 115, which is downstream from the point at which the zipper fastener is attached to the web. The vertical fill tube 115 may have a pair, or more, film pull belts adjacent to the fill tube 115, to aid in positioning of the web material. The vertical fill tube 115 may also be part of a vertical fill tube assembly that includes a forming collar for forming the web material into the vertical fill tube 115. Material, that is the product to be packaged, may then be fed into the tubular shaped web material via feed mechanism 119. An additional web material drive roll and a tensioning mechanism may also be present below the vertical fill tube 115 to position the filled web material with a horizontal sealing, perforating and severing mechanism 117. The horizontal sealing, perforating and severing mechanism 117 includes a finish jaw that completes the top seal and creates a perforated portion thereby creating an air-tight, top-opening package 121.

Figure 2:
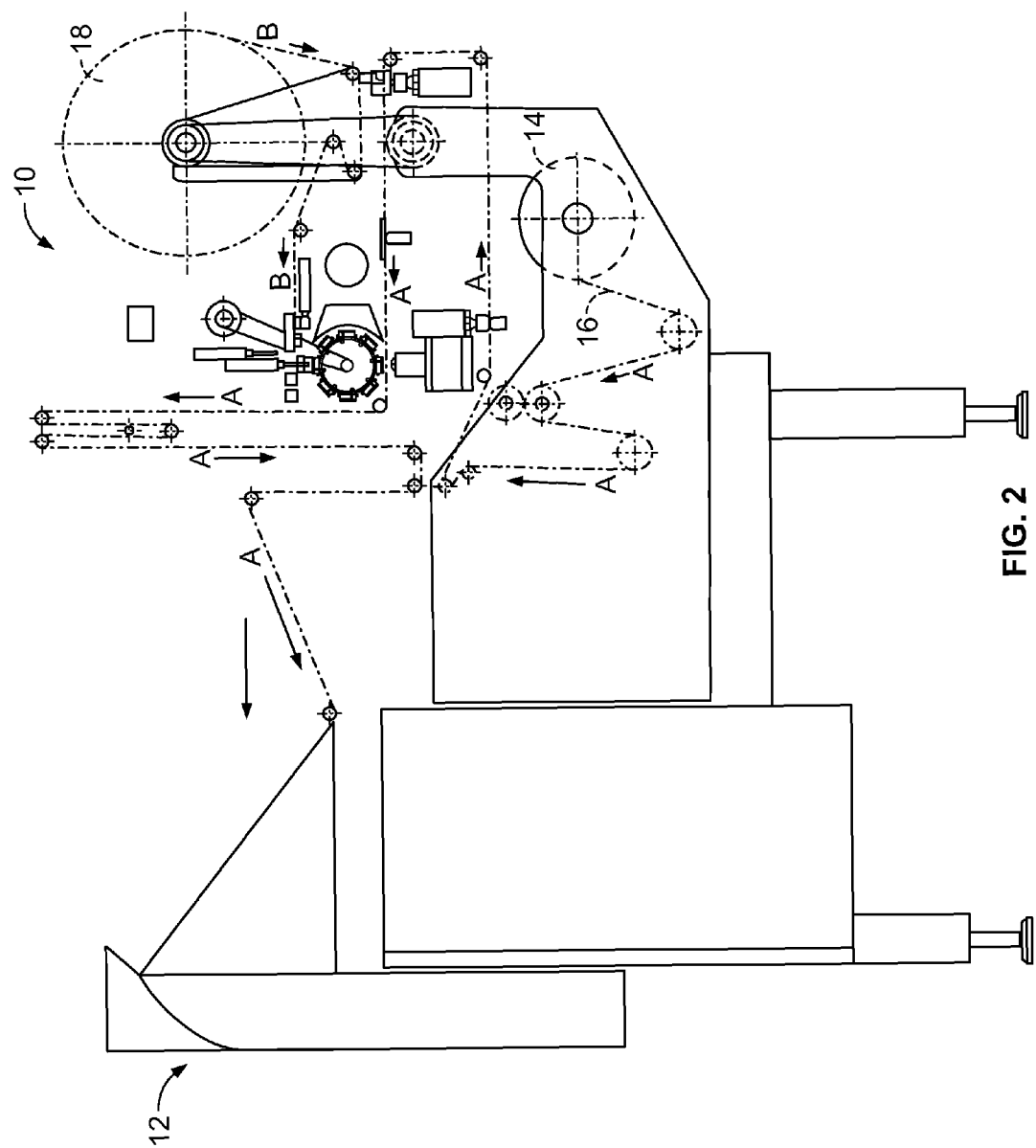
FIG. 2 is a side elevation of a host packaging machine with the apparatus used to apply reclosable fasteners from the supply which is operatively attached thereto.
Figure 3:
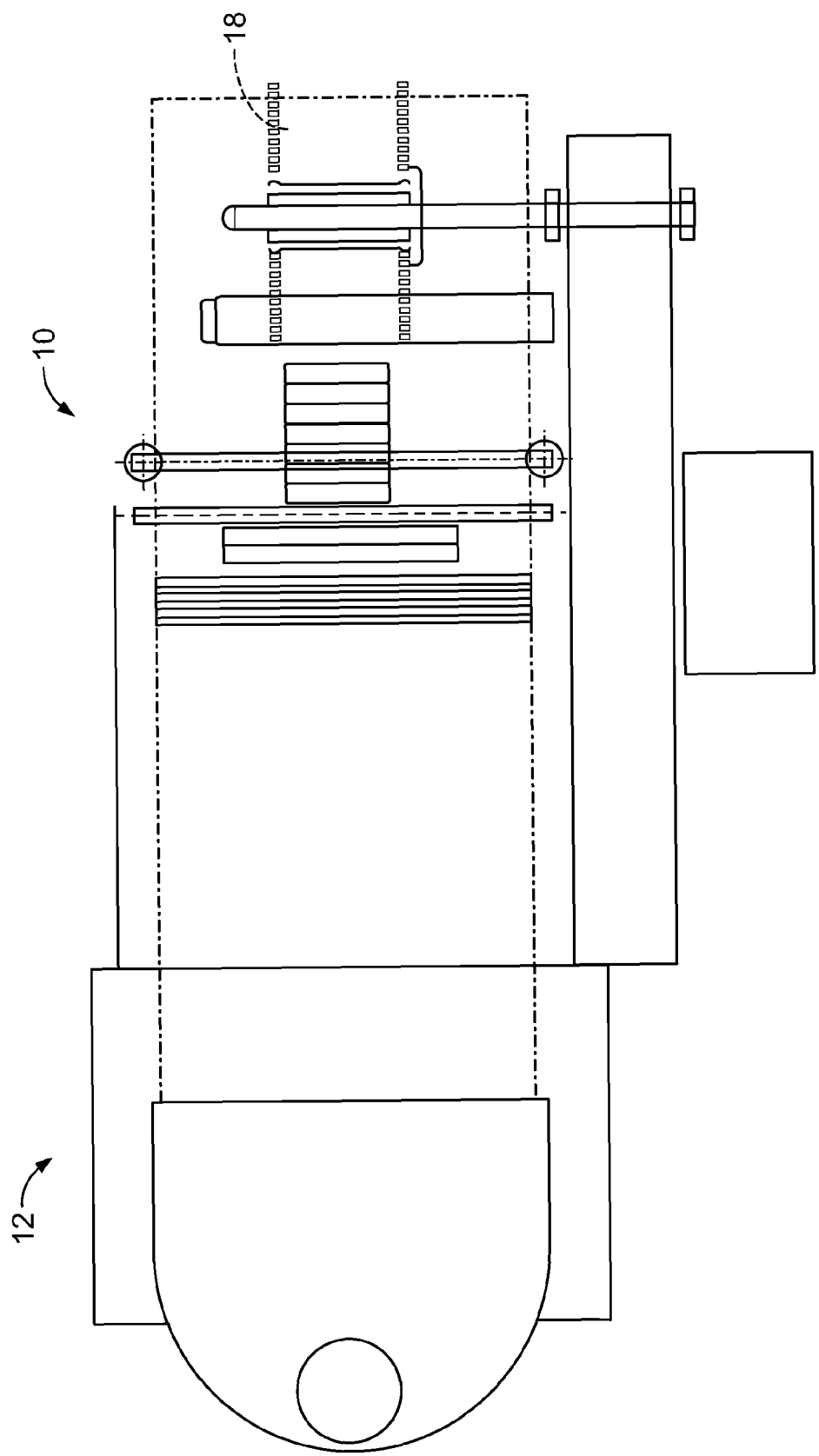
FIG. 3 is a top plan view of the host machine and apparatus shown in the view of FIG. 2.

In FIG. 2, another embodiment is shown where the fastener attaching apparatus is generally indicated as 10, and is shown as being operatively attached to a host form, fill, seal and separate packaging machine generally indicated as 12. While the scope of the presently described embodiment is not to be limited by the host machine to which it is operatively attached, a vertical form, fill, seal and separate machine is illustrated in the drawing figures as host machine 12. As is well known in the industry, host machine 12 would typically include a supply of flexible material from which containers are to be made. The apparatus 10 utilizes that same supply of flexible material, and the roll of such material is indicated as 14 in the drawing figures. The travel of web 16, indicated by directional arrows A, from roll 14 through apparatus 10, and its treatment by apparatus 10 will be described in greater detail hereinafter.

Still referring to the view of FIG. 2, apparatus 10 further comprises a supply of reclosable zipper-type fasteners, shown in this embodiment as fastener roll 18. It is this roll 18, and more particularly its fastener web 20, which is the subject matter of this disclosure, as well as the resultant reclosable bags. Fastener web 20 is guided along a second path, indicated by directional arrows B, for attachment to web 16 as is more fully set forth hereinafter.

It is also to be noted that driving power for apparatus 10 is provided by programmable motor 13 and function controller 11, and that apparatus 10 does comprise a web position detector 22 which is disposed along the first path traveled by web 16 and is operatively connected to controller 11 so as to regulate the travel of both web 16 and fastener web 20. Detector 22 may sense indicia disposed on the surface of web 16 and actually transmits signals to controller 11 to cause the travel along path A and second path B to start and stop dependent upon the size of the finished container being made by host machine 12 so as to ensure proper placement of the reclosable fastener onto web 16. Alternatively, detector 22 may employ other means, such as a roller engaging a surface of web 16, to detect its travel along path A. Referring to the more detailed view of FIG. 4, one may see a preferred location for detector 22 along path A, downstream from roll 14.

Figure 4:
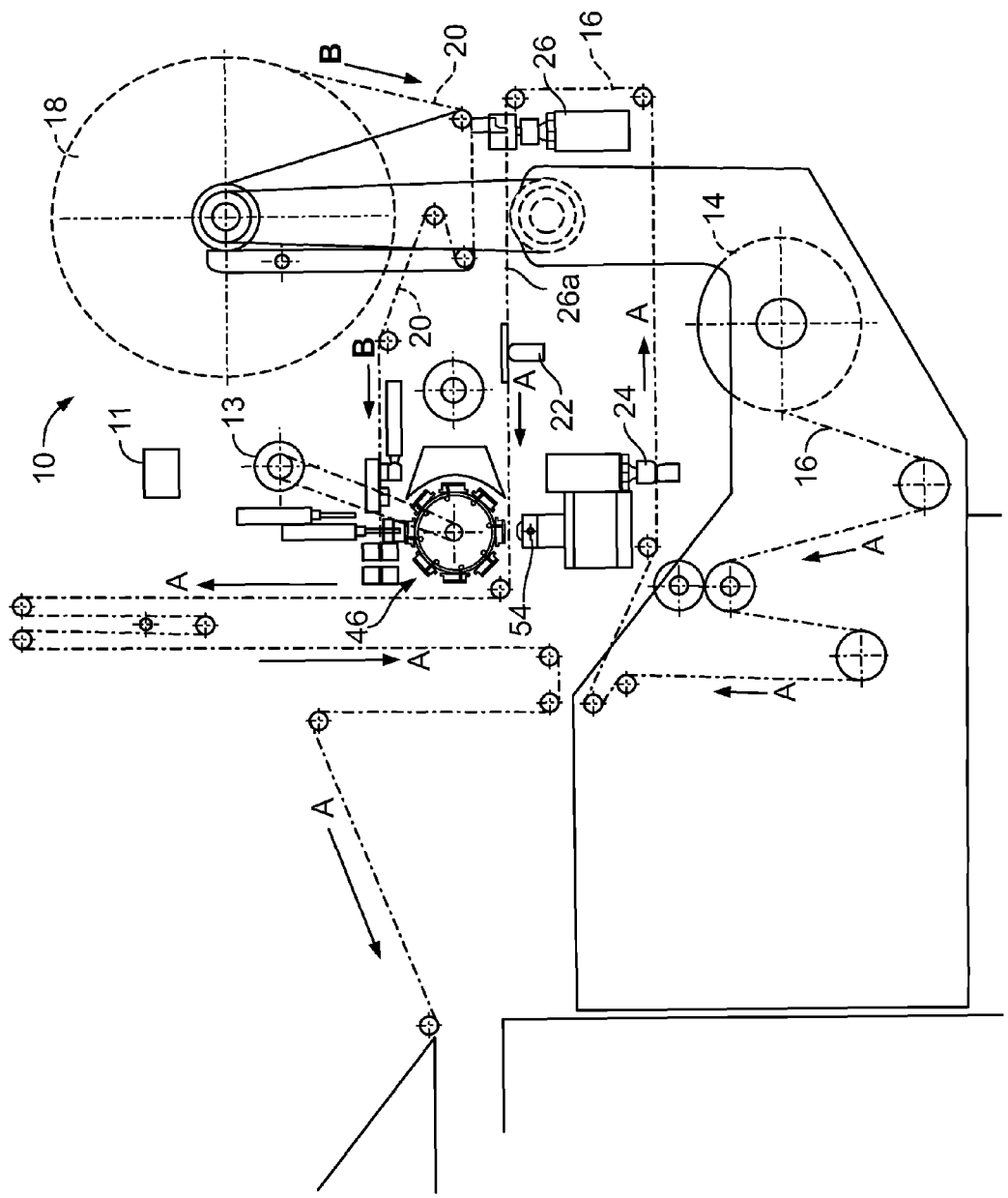
FIG. 4 is an enlarged side elevation of the apparatus as shown in the view of FIG. 2.

Still referring to the view of FIG. 4, when detector 22 senses the presence of an indicia calling for the movement of web 16 to halt, this is accomplished by sending a signal to controller 11 which in turn causes the application of web brake 24. When web 16 is thus stopped, punch 26 is actuated to perforate a segment of web 16, thereby forming a removable/rupturable portion of flexible material in web 16.

Figure 5:
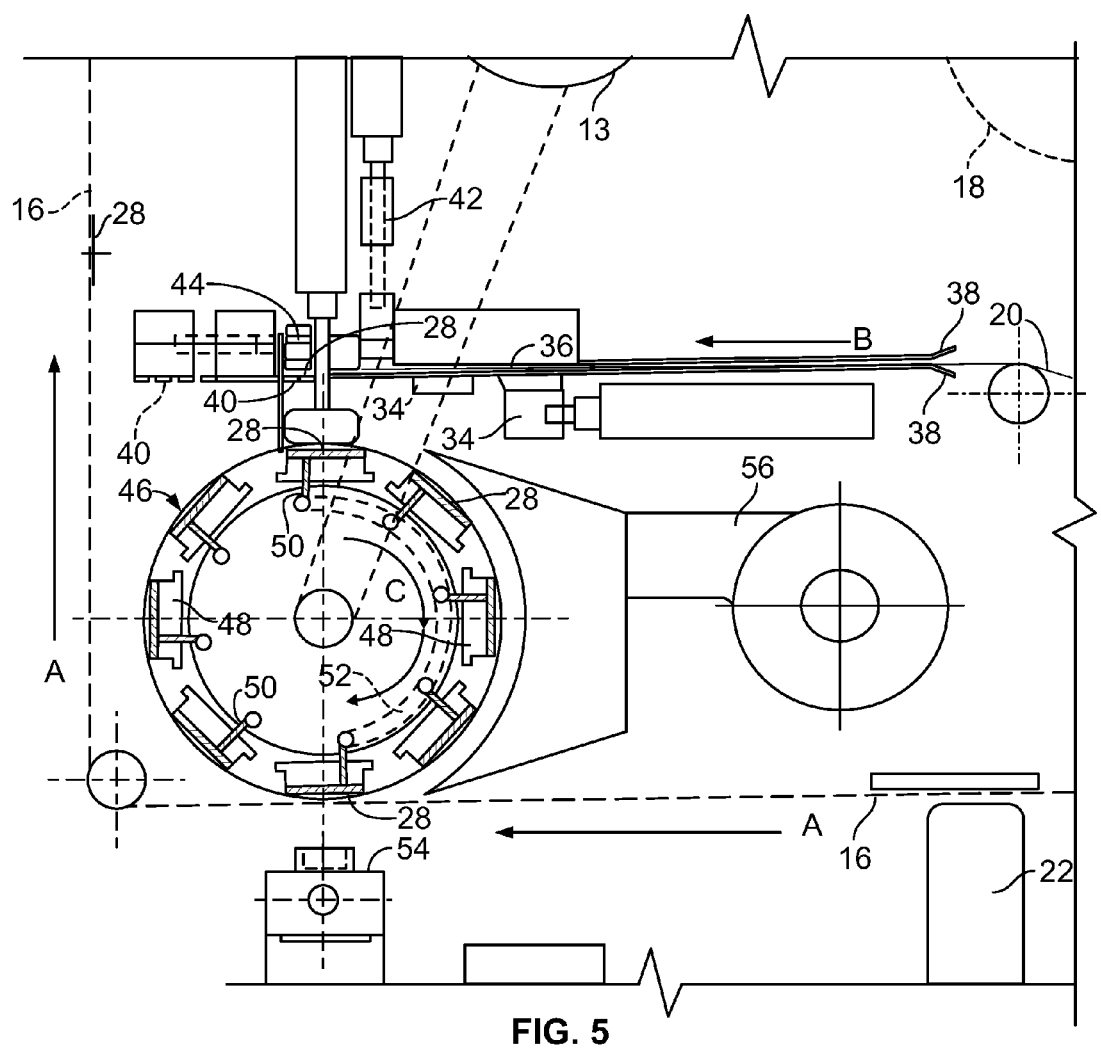
FIG. 5 is a further enlarged side elevation of the apparatus showing the means for guiding the continuous supply of fasteners and the means for transferring individual ones of the fasteners.
Figure 6:
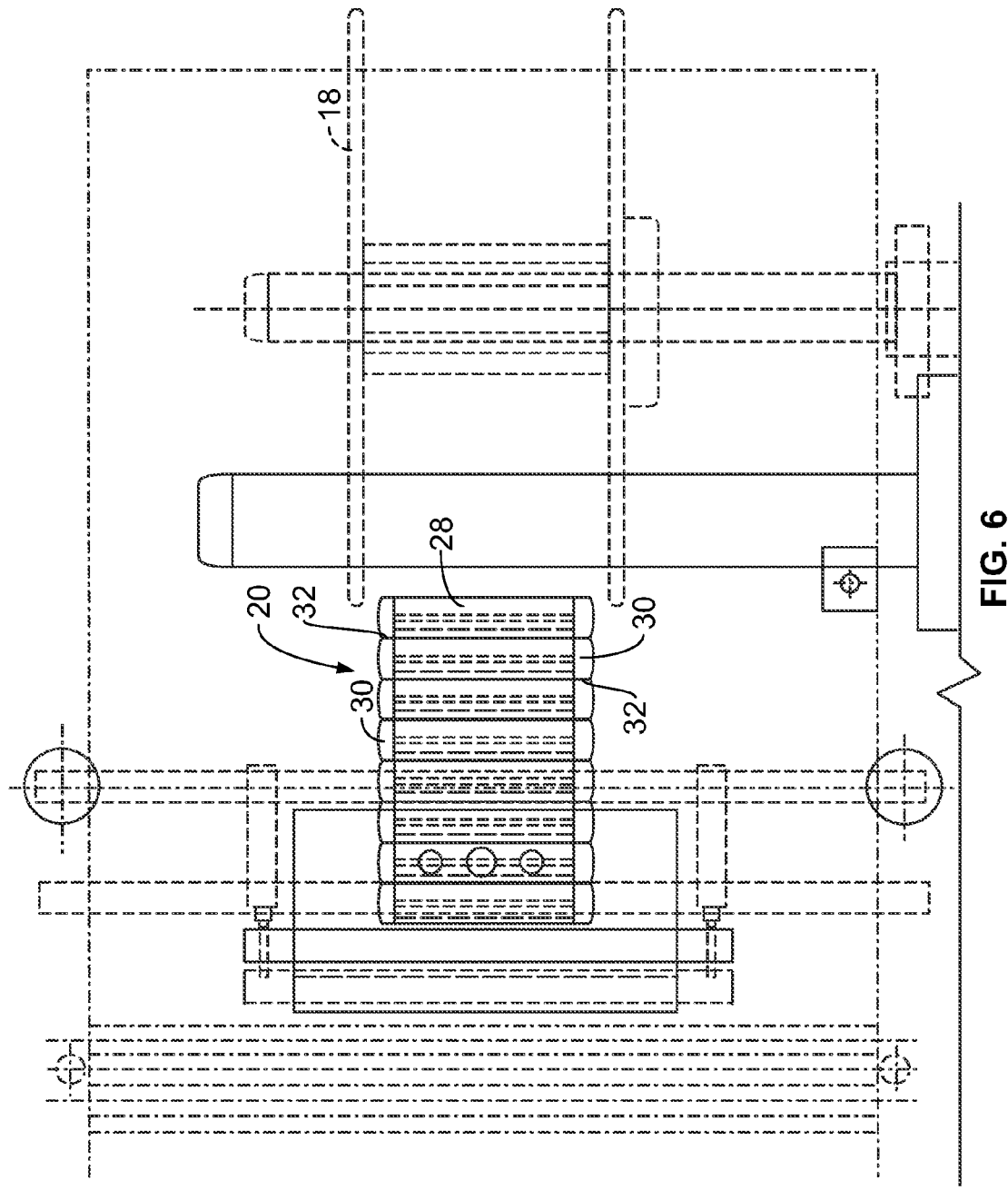
FIG. 6 is an enlarged top plan view of the apparatus as shown in the view of FIG. 3.
Figure 8:
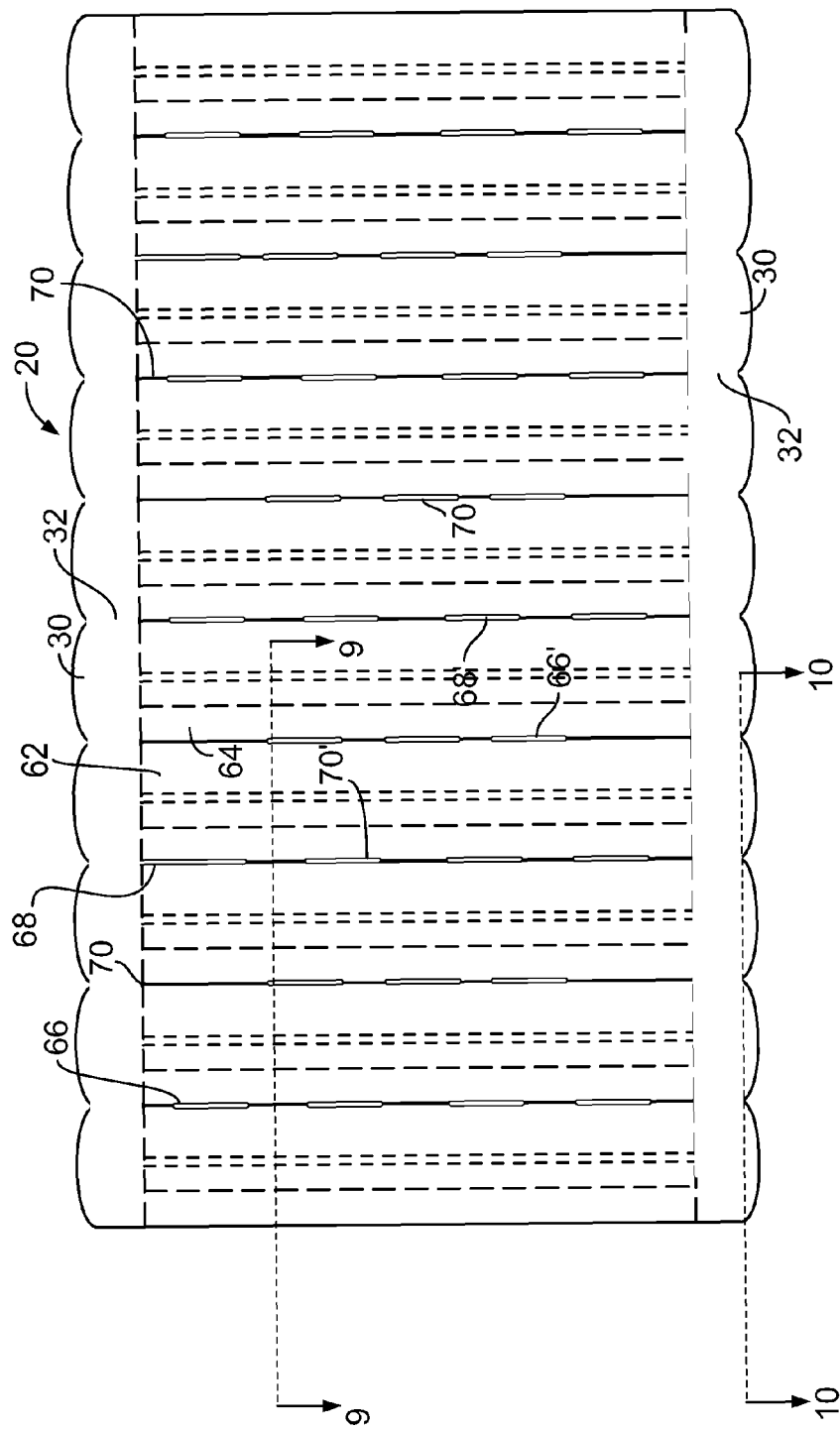
FIG. 8 is a top plan view of the supply shown in the view of FIG. 7.

Attention is now invited to the detailed view of FIGS. 5 and 6 as well as the view of FIG. 4, with particular regard to the elements of apparatus 10 whereby individual reclosable zipper-type fasteners 28 are attached to web 16 in overlying, surrounding relation to the removable/rupturable portion 26a formed by punch 26. Fastener web 20 comprises a plurality of individual zipper-type fasteners 28, each defining a perimeter and having opposed distal ends. Each fastener 28 comprises a pair of mating, reclosable sealing strips, one of which is a male fastener part and the other of which is a female fastener part. The male and female parts are joined to each other and the opposed distal ends are fused (flattened and broadened) as indicated at 30 in the view of FIGS. 6 and 8. It is to be understood that the phrase "fused (flattened and broadened)" is meant to convey that the opposed distal ends are flattened to a thickness that is substantially the same as the thickness of the flanges of the male and female fastener parts, as shown in the sectional view of FIG. 10. This is important to the formation of an acceptable final package wherein the fastener 28 is substantially hermetically sealed to the web 16 from which the package is formed. That is to say, the thickness of the fastener that is actually attached to web 16 is substantially constant around the perimeter of each fastener 28. Adjacent ones of the fasteners 28 are joined together at fused distal ends 30 as by a weld 32 so as to provide a fastener web 20 wherein the reclosable zipper-type fasteners 28 move along second path B with the sealing strips disposed in substantially transverse relation to the direction of travel. Weld 32 may actually be formed when the distal ends are flattened and broadened as indicated at 30 and as seen in FIG. 8. Thus, in the detail view of FIG. 5, one sees an end view of the fastener web 20 that is transverse to second path B.

Figure 7:
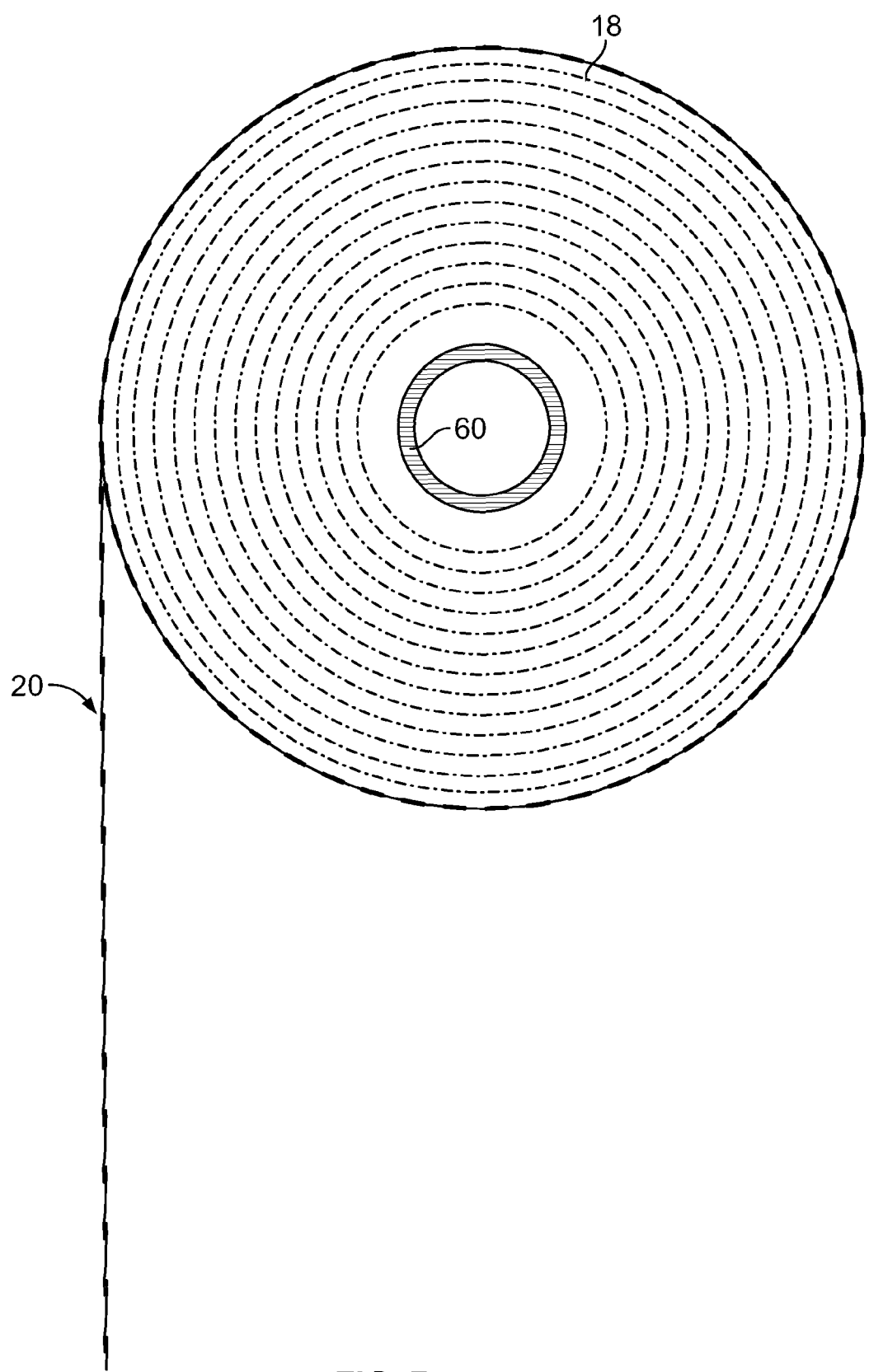
FIG. 7 is an enlarged rear elevation of the supply roll of this disclosure.
Figure 9:
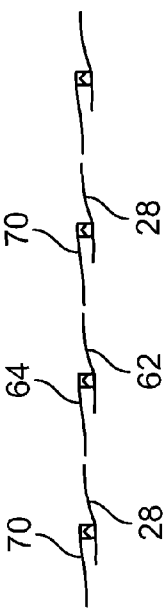
FIG. 9 is a sectional view taken along line 8-8 of FIG. 8.

Referring to the detailed views of FIGS. 7-10, one may see structural details of the continuous supply of this disclosure. As shown in the view of FIG. 7, fastener roll 18 is wound around a roll core 60 for operative mounting on apparatus 10 as shown in FIG. 2. The fastener web 20 is drawn from roll 18 to travel along second path B, which is essentially parallel to path A just upstream from transfer drum 46. A segment of the web 20 is shown in greater detail in the view of FIG. 8. With specific reference to FIGS. 8 and 9, and as stated above, each of the fasteners 28 comprise a male part 62 and a female part 64, parts 62 and 64 being joined to each other as clearly seen in FIG. 9. The distal ends of each fastener 28 are flattened as indicated by reference numeral 30, and adjacent ones of those flattened ends 30 are fused to each other as indicated by reference numeral 32. Thus, as can be seen in the views of FIGS. 8 and 9, the major longitudinal dimension of each of the fasteners 28, as indicated by sides 66 and 68 of each fastener 28 is free and separate from its adjacent fastener 28 in this embodiment. This "free and separate" relationship between adjacent ones of the fasteners 28 is indicated by reference numeral 70. However, it is to be understood that adjacent ones of the sides 66 and 68 may be attached to each other, continuously or by spot tacking, dependent on actual operating conditions. Such a structure is considered to be within the scope of this disclosure. Separation of individual fasteners 28 from fastener web 20 is described hereinafter.

Figure 11:
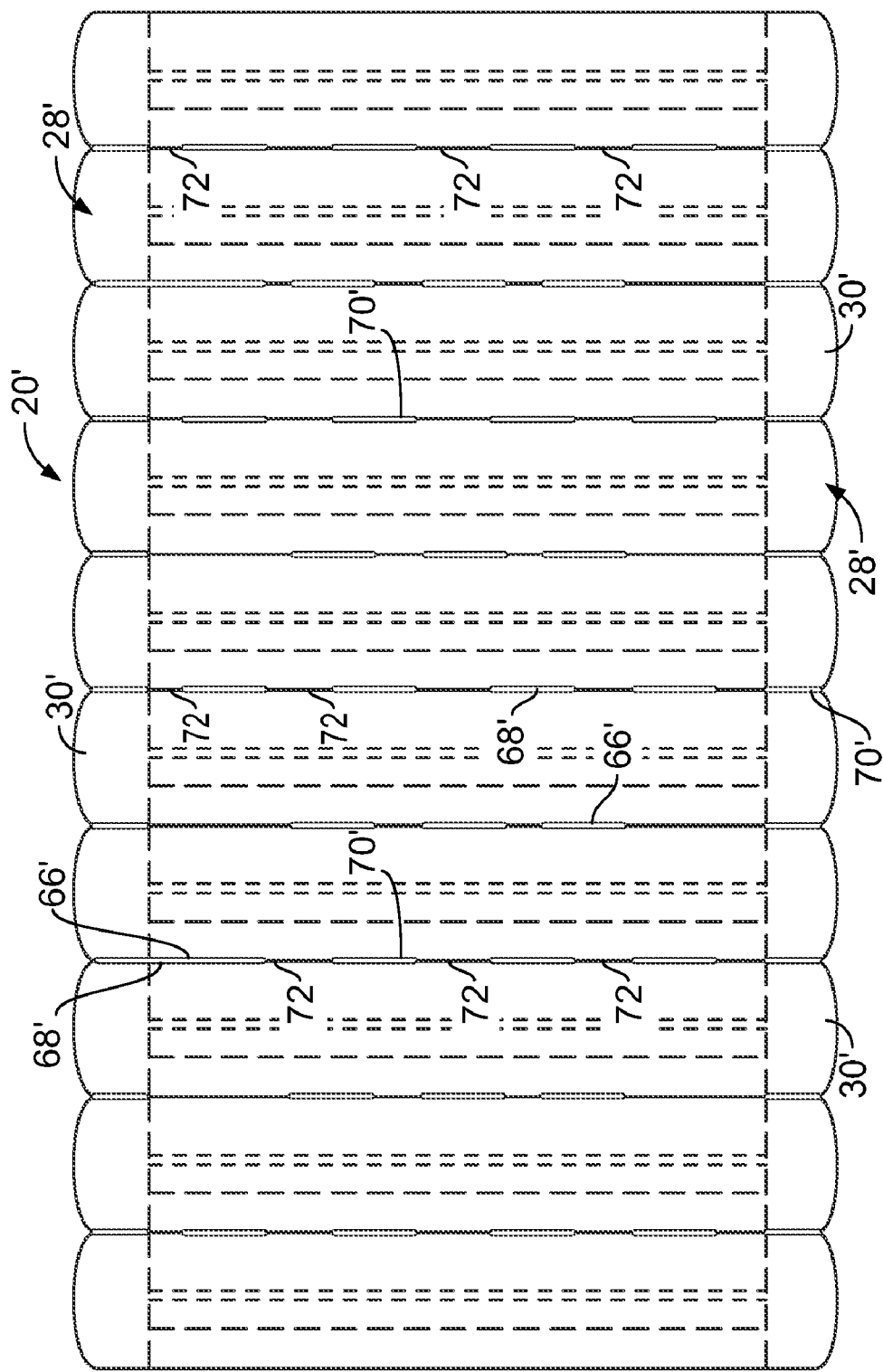
FIG. 11 is a top plan view of a second embodiment of the supply of this disclosure.

Referring to FIG. 11, one may see a second embodiment for the present disclosure. Similar structural elements are identified by like reference numerals with the addition of a prime (') mark. Thus, FIG. 11 illustrates a fastener web 20', which would be drawn from roll 18 (not shown). As in the preferred embodiment of FIG. 8, the distal ends of each fastener 28' are pre-flattened as indicated by reference numeral 30', but in this second embodiment flattened ends 30' are not required to be fused together. Rather, individual ones of the fasteners 28' may be joined to an adjacent one of the fasteners 28' as by tack welding virtually anywhere along the longitudinal dimension of the fasteners 28' between adjacent sides 66' and 68', to enhance the lateral stability of the web 20' and the roll 18 when relatively long (e.g., greater than about seven inches) fasteners 28' are used. The joined relationship is indicated in the view of FIG. 11 by tack welds 72. Adjacent sides 66' and 68' are only joined at tack welds 72, leaving those adjacent sides "free and separate" along the longitudinal dimension, as indicated at 70'. Of course, tack welds 72 could also be used in the embodiment of FIG. 8 in addition to the illustrated flattened and fused ends 30.

As is well known in the fastener industry, reclosable fasteners are generally manufactured by extruding the respective male and female parts, joining the two parts, and winding the uncut fastener onto a reel. It is from such a supply of uncut fastener that the continuous supply of the embodiments of the present disclosure are made. Predetermined lengths of fastener are cut from the supply of uncut fastener and arranged in side-to-side relationship to each other. Then, using means for applying heat and pressure, as is known in the art, the distal ends of each fastener are flattened and thereby fused to adjacent flattened ends of the other fasteners to yield a fastener web 20 which may be wound onto a core 60 to provide the fastener roll 18. Of course, in the second embodiment shown in FIG. 11, the distal ends are pre-flattened just as described above, but are not fused to an adjacent flattened end. Rather, the individual fastener strips with distal ends pre-flattened are then aligned as shown in FIG. 11 and tack welded to each other by the application of heat and pressure. These steps and the resulting fastener roll 18 are quite important in order to provide a fastener 28 which may be applied to web 16 in overlying relation to the removable/rupturable portion of web 16 while preserving and ensuring the integrity of the final package. This is particularly important as when food products are being placed in the final package. Absent the step of first flattening the distal ends of each fastener, the material would simply be too heavy and thick to make an hermetic seal onto web 16 without melting or otherwise compromising the integrity of web 16. Obviously, this would result in a totally unsatisfactory final package.

Movement of fastener web 20 along path B is accomplished by pusher 34 which reciprocates as shown in phantom in the view of FIG. 5 in response to signals received from controller 11. Tip 36 of pusher 34 abuts the lip defined by the joining of the male and female fastener parts of each fastener 28, thereby indexing web 20 along second path B.

As fastener web 20 is indexed along second path B through guide 38, the last, or most distal, individual fastener 28 rests on shutter 40 with shutter 40 supporting distal fastener 28, separator 42 is actuated by controller 11 to detach welds 32, thereby separating the distal fastener 28 from fastener web 20. While separator 42 may comprise any suitable device for separating individual fasteners 28 from fastener web 20, in this embodiment, separator 42 comprises a pair of knife edges. Shutter 40 is then retracted as shown in phantom in the view of FIG. 5, and plunger 44 is actuated to transfer the separate distal fastener 28 onto the transfer drum generally indicated as 46. These actions are also controlled by signals received from controller 11.

Transfer drum 46 indexes clockwise, as indicated by directional arrow C in the view of FIG. 5 and is driven by motor 13 which is also operated by signals received from controller 11. Disposed around the perimeter of transfer drum 46 are a plurality of strip receivers 48. Passageways 50 are formed through each of the receivers 48 and, referring to transfer drum 46 as a clock face for the sake of clarity in the view of FIG. 5, it can be seen that each of the passageways 50 are disposed in fluid-communicating relation to a conduit 52 from approximately the 12 o'clock position to slightly after the 5 o'clock position whereby negative pressure may be drawn through conduit 52 and each of the respective passageways 50 so as to retain an individual fastener 28 within the respective strip receiver 48.

As one of the strip receivers indexes to the 6 o'clock position, communication of passageway 50 with conduit 52 is interrupted, thereby releasing fastener 28 onto web 16. More particularly, the fastener 28 is released onto web 16 in registry with the removable/rupturable portion 26a formed through web 16 by punch 26 as previously described. Then, sealing means 54 is actuated by controller 11 to attach fastener 28 in overlying, surrounding relation to the removable/rupturable portion of web 16.

In order to provide for a complete seal of fastener 28 to web 16, this preferred embodiment for apparatus 10 further comprises a heater blower 56 to preheat/condition the fasteners 28 as transfer drum 46 indexes, and this heater blower 56 is operatively disposed from about 1:30 to about 4:30 on the side of transfer drum 46.

Downstream from transfer drum 46 and sealing means 54, web 16, now having individual fasteners 28 attached thereto, continues to move along first path A through festoon 58 for delivery to host machine 12 where a container having a reclosable fastener is formed, filled, sealed and separated. Because apparatus 10 is driven by programmable motor 13 and controller 11 in cooperative relation with the host machine 12, it will be appreciated that the apparatus of the present disclosure provides to host machine 12 a flexible web of material having reclosable fasteners attached thereto in a non-intrusive manner. More specifically, the addition of apparatus 10 between roll 14 and host machine 12 results in virtually no interference with the normal operation of host machine 12. A substantially constant, uninterrupted supply of web 16 having fasteners 28 attached thereto is provided from festoon 58. Thus, it will be appreciated that the various embodiments herein disclosed provide an improved continuous supply of preformed reclosable fasteners for use in combination with an apparatus for attaching reclosable fasteners to a flexible web of material that is easily adaptable to provide a web of material having reclosable fasteners attached thereto to a conventional form, fill, seal and separate packaging machine, resulting in an overall improved packaging systems capable of producing high quality reclosable packages without the necessity of replacing the entire packaging machine. It is also to be understood that the various elements of apparatus 10, and particularly the programmable motor 13 and controller 11, are easily adjusted in response to particular bag sizes being made by host machine 12. Proper registry of the individual fasteners 28 in overlying relation to the cuts made in web 16 by punch 26 is insured by signals generated from detector 22 sent to and processed by controller 11. Similarly, it is to be understood that the continuous supply of this disclosure is not to be limited to any singular form of reclosable zipper, nor its use with only the apparatus 10 described herein.

Figure 10:
FIG. 10 is a sectional view taken along line 9-9 of FIG. 8.

The fastener web 20' of FIG. 10 is used in substantially identical fashion to that just described with regard to the preferred embodiment for web 20. However, the separator 42 would be configured and actuated to sever the tack welds 72, thereby separating a fastener 28' from web 20'.

Figure 12:
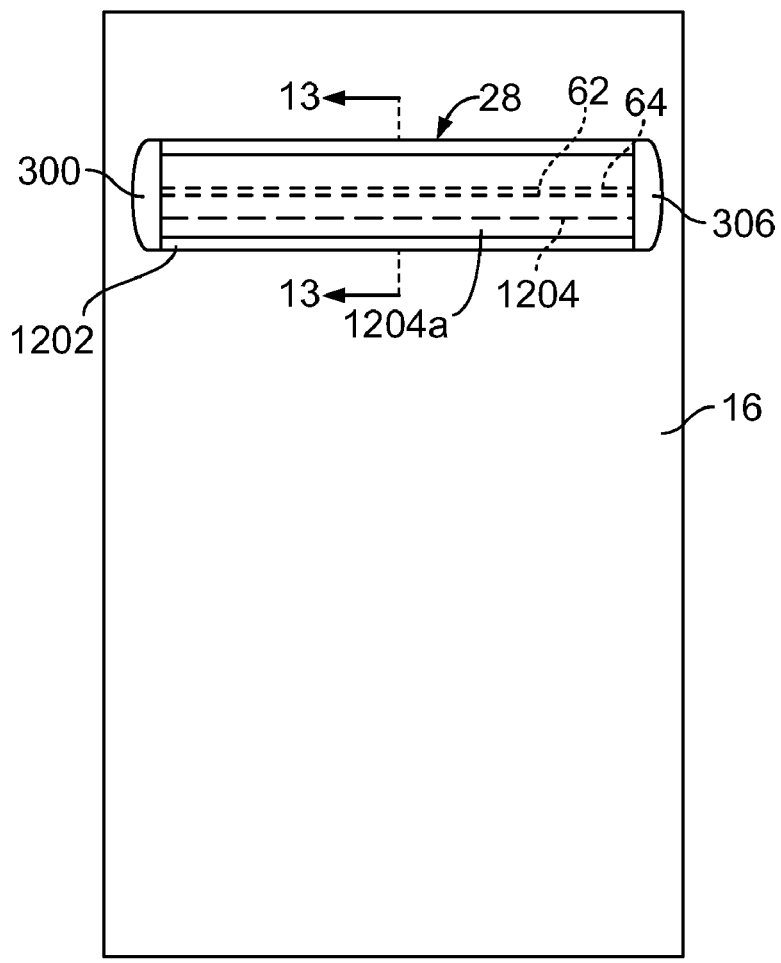
FIG. 12 is an exemplary embodiment of a container 1200 having a reclosable fastener that may be formed by a host machine.
Figure 13:
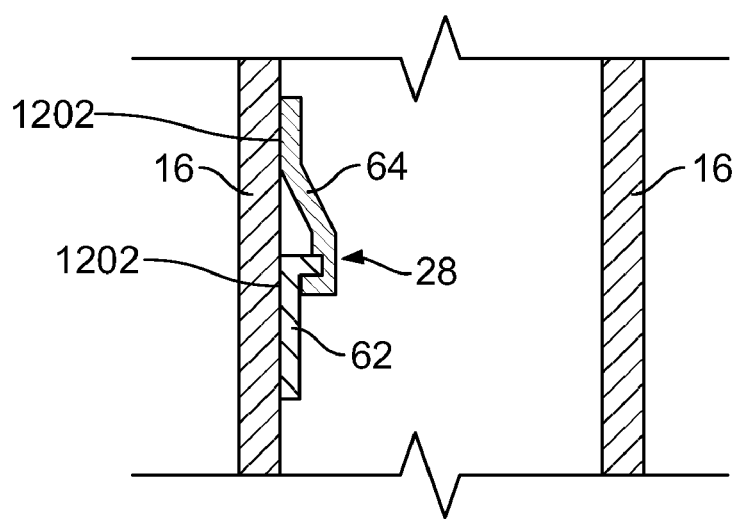
FIG. 13 shows further details of the fastener of the container shown in FIG. 12.

FIG. 12 and FIG. 13 show one example of a container 1200 having a reclosable fastener that, as noted above, may be formed by a host machine 12. It will be understood, however, that container 1200 may be formed by any suitable apparatus or method. As described above, container 1200 includes web 16 and fastener 28. Fastener 28 contains opposed distal, flattened, and broadened ends 30 formed by the application of heat and pressure. Fastener 28 further contains a hermetic perimeter seal 1202, which seals only one wall to the male 62 and female 64 mating reclosable sealing strips. As described above, apparatus 10 uses punch 26 to form a removable/ rupturable portion 1204a in the web 16, which is shown as perforated segment 1204 in FIG. 12. As illustrated, fastener 28 is attached to web 16 in registry with the perforated segment 1204.

Figure 14:
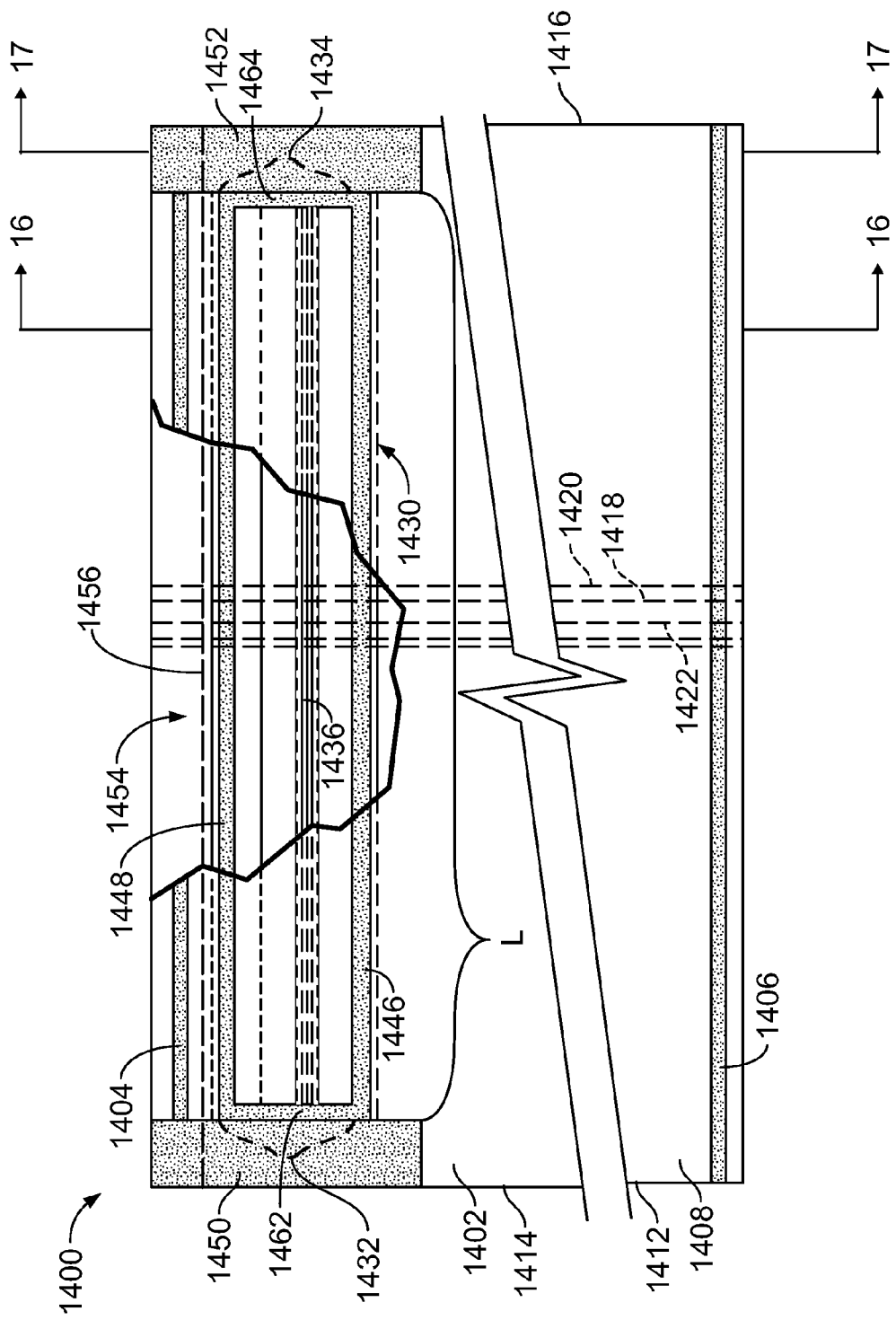
FIG. 14 is a front plan view of another embodiment of a reclosable bag of the present disclosure.
Figure 15:
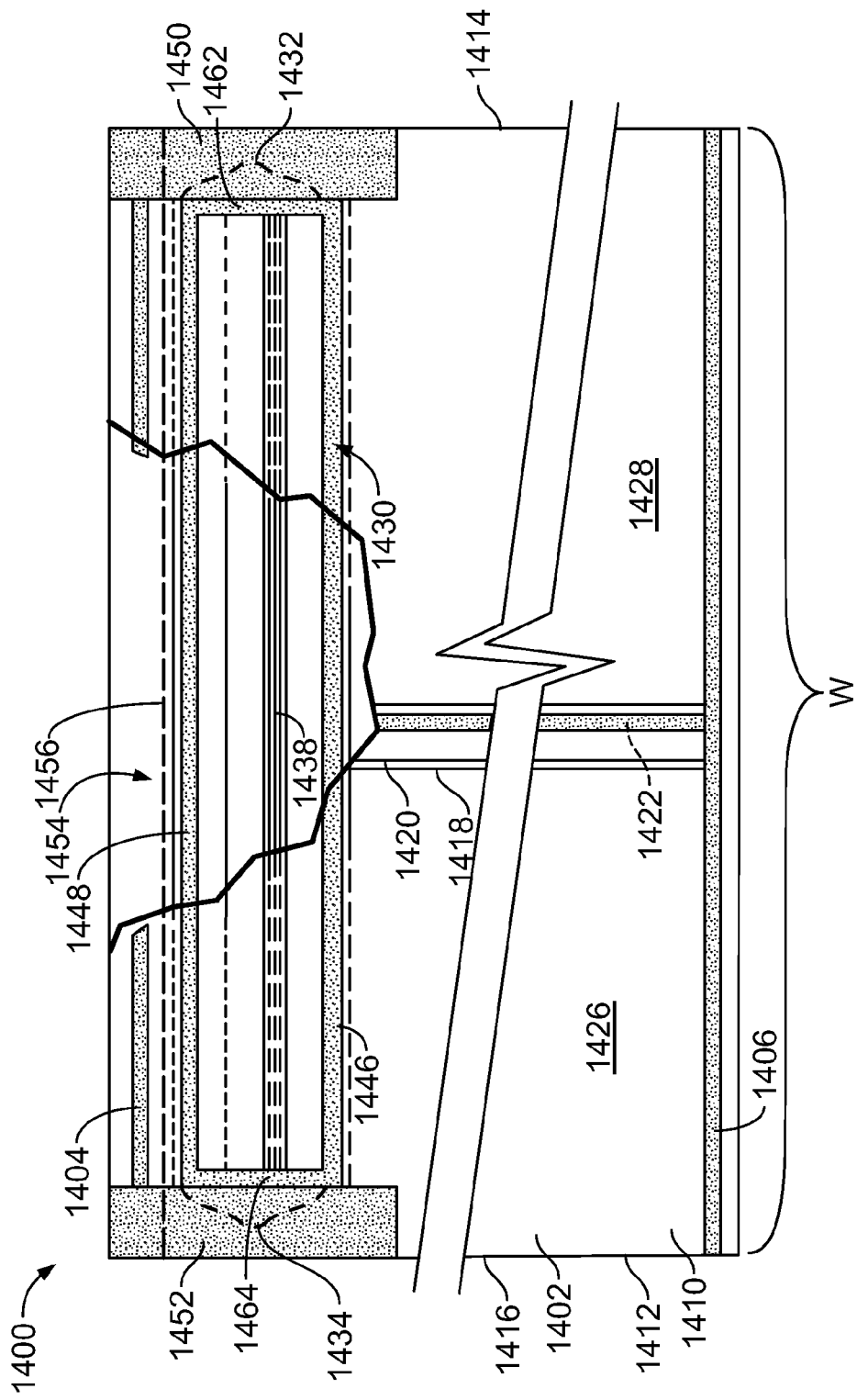
FIG. 15 is a back plan view of the bag of FIG. 14.
Figure 16:
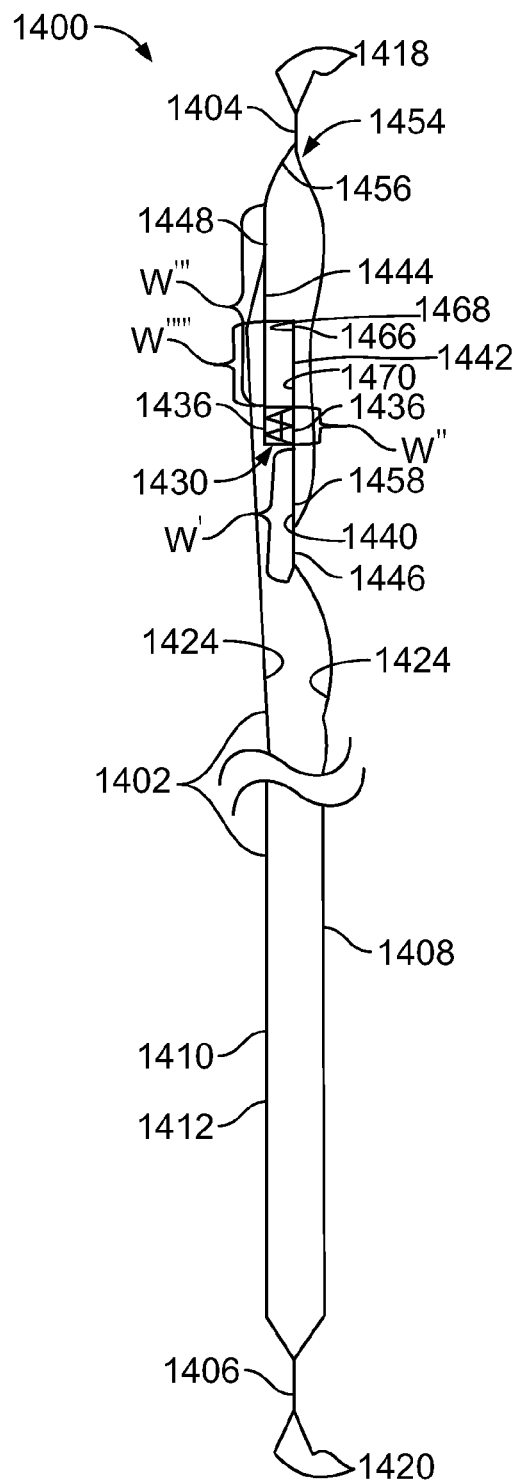
FIG. 16 is a side cross sectional view of the bag of FIG. 14.
Figure 17:
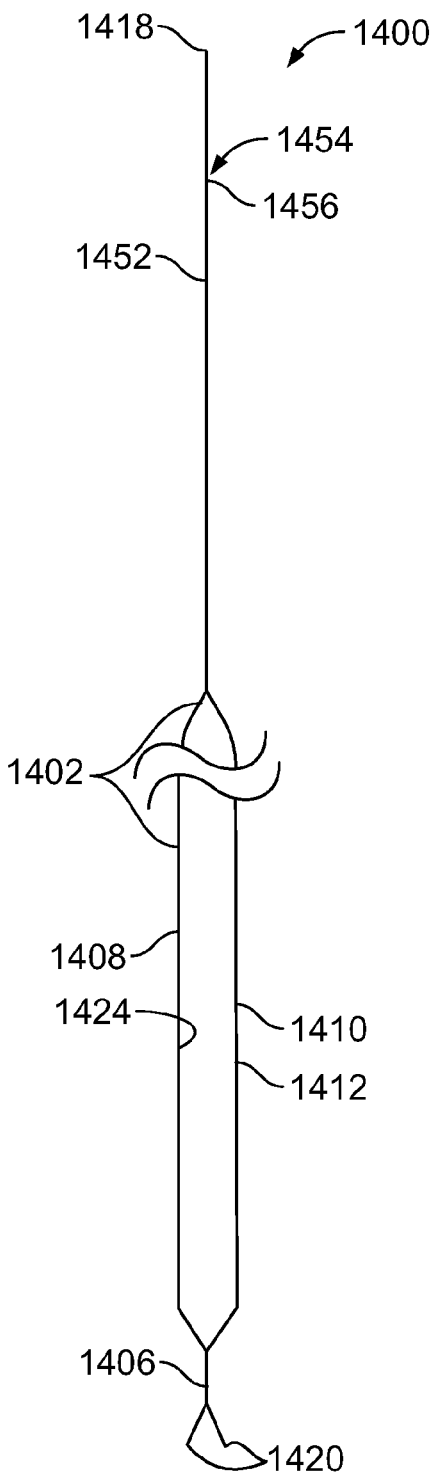
FIG. 17 is a side cross sectional view of the bag of FIG. 14 through a side seal of the bag; and, FIG. 18 is a perspective view of a rectangular sheet of film having a plurality of reclosable fastener assemblies thereon prior to a form, fill and seal operation.

FIG. 14 is a front plan view of reclosable back-seam bag 1400, which is described in U.S. Pat. No. 6,361,212 and which is incorporated herein. Bag 1400 includes a bag body 1402. Bag body 1402 (FIGS. 14-17) has a top seal 1404 and a bottom seal 1406, and a front wall 1408 and a back wall 1410. Front wall 1408 (FIGS. 14, 16 and 17) is joined to the back wall 1410 at the top seal 1404 and the bottom seal 1406 (FIGS. 14-17). It is appreciated that bag body 1402 can be formed on conventional form fill and seal machines known in the art as discussed above.

Bag 1400 includes reclosable fastener assembly 1430. Reclosable fastener assembly 1430 includes two ends 1432, 1434. Between ends 1432, 1434, a first continuous elongated profile strip 1436 is releasably interlocked with a second continuous elongated profile strip 1438. It is appreciated that first continuous elongated profile 1436 and the second continuous elongated profile 1438 have protruding male and female members (not shown) which when interlocked provide an airtight and watertight seal. Many types of male and female members are known in the art and can be used in the various embodiments.

At each end 1432, 1434 of the reclosable fastener assembly 1430 is an airtight and/or watertight side seal 1450, 1452. Each side seal 1450, 1452 connects an end of the reclosable fastener assembly 1430 to an inside surface 1424 of front wall 1408 and an inside surface 1424 of back wall 1410. Any of the seals described herein can be made by a variety of devices including heat sealers, ultrasonic sealers, and other devices known in the art. The seals also may be made with an adhesive.

A continuous airtight and/or watertight lower seal 1446 is disposed along the length L of the reclosable fastener assembly 1430 and is positioned below the profile strips 1436, 1438. It is appreciated that seal 1446 is placed such that seal 1446 connects the reclosable fastener assembly 1430 to the front wall 1408 prior to rectangular sheet of film 1412 being formed into a tubular structure precursor of bag body 1402. That is, seal 1446 preferably connects reclosable fastener assembly 1430 to rectangular sheet of film 1412 while the sheet of film is still in a substantially flat state.

A continuous airtight and/or watertight upper seal 1448 along the length L of the reclosable fastener assembly is positioned above the profile strips 1436, 1438. The upper seal 1448 connects the reclosable fastener to back wall 1410. Preferably, upper seal 1448 is made after the bag body 1402 is substantially complete, e.g. after the bag body 1402 has been substantially completed on a form fill and seal machine. This is accomplished by sealing jaws on the form fill and seal machine.

In one embodiment, reclosable back-seam bag 1400 includes a first continuous elongated profile strip 1436 that has a front wall connecting flange 1440 and a gripping flange 1442. Both the front wall connecting flange 1440 and the gripping flange 1442 having widths W', W41'" greater than a width W" of the first continuous elongated profile strip 1436. It is appreciated that by providing flanges 1440, 1444, the problems associated with sealing an irregularly shaped surface, e.g. a zipper profile, to a smooth surface are eliminated. The flange 1440 and flange 1444 provide a substantially smooth, planar and uniform surface to which to seal the inside surface 1424 of rectangular sheet of film 1412 thereto.

By way of example, front wall connecting flange 1440 is sealed to front wall 1408 at inside surface 1424'. Similarly, second continuous elongated profile strip 1438 has a back wall-connecting flange 1444. The back wall connecting flange 1444 has a width W''' greater than a width W" of the second continuous elongated profile strip 1438, and in a variant a width greater than gripping flange 1442. Back wall connecting flange 1440 is sealed to back wall 1410 at back wall connecting seal 1448.

To improve the appearance and air and watertightness of bag 1400 it is preferred that the length L of the reclosable fastener assembly 1430 is less than the width W of back wall 1410.

In another embodiment, reclosable back seam bag 1400 includes a frangible access 1454. Access 1454 can take many forms including a crease line, a score line, or a plurality of perforations. Preferably, access 1454 is substantially parallel to the reclosable fastener assembly 1430. Removal of access 1454 exposes the releasable fastener assembly 1430 and provides access to the gripping flange 1442, and profile strips 1436, 1438. One feature of the embodiments is that frangible access 1454 is located both on the front wall 1408 and on the back wall 1410 of the bag body 1402 adjacent the reclosable fastener assembly 1430 and above the upper seal 1448. In the various embodiments, frangible access 1454 may comprise a plurality of perforations 1456.

Back wall 1410 of bag body 1402 is formed from rectangular sheet of film 1412 (FIG. 6) on a conventional form, fill and seal machine. Preferably, the form fill and seal machine is a vertical form, fill and seal machine. Film 1412 can be made from any suitable material but is preferably made from a polymeric material. Film 1412 is folded along two longitudinal folds 1414, 1416, as the film passes through the form fill and seal machine. The vertical edges 1418, 1420 are overlapped and sealed as is conventional to form back seam 1422. Back wall 1410 has two sides 1426, 1428. Each side 1246, 1428 is defined between back seam 1422 and a respective one of the longitudinal folds 1414, 1416.

Reclosable fastener 1430 includes two ends 1432, 1434, a first continuous elongated profile strip 1436 and a second continuous elongated profile strip 1438. First continuous elongated profile strip 1436 is releasably connected to the second continuous elongated profile strip 1438. It is appreciated that profile strips 1436, 1438 can be of the type conventionally known in the art, including male and female interlocking members. By way of example, strip 1436 is mutable to strip 1438, and either strip 1436 or strip 1438 can be complementary male and female strips as required.

First continuous elongated profile strip 1436 has a front wall connecting flange 1440 and a gripping flange 1442. Front wall connecting flange 1440 is heat sealed or ultrasonically sealed to rectangular sheet of film 1412 while film 1412 is in a substantially flat state. The sealing of front wall connecting flange 1446 to film 1412 occurs prior to the formation of a tube (not shown) from film 1412 on a conventional form fill and seal machine. It is further appreciated that strips 1436, 1438 are interlocked at the time flange 1446 is sealed to film 1412. In particular, front wall connecting flange 1446 is connected to the inside surface 1424 of the rectangular sheet of film 1412 and the front wall 1408 of the bag body 1402 at a front wall seal 1446. Front wall seal 1446 is substantially parallel to top seal 1404 and spaced between the bottom seal 1406 and the profile strips 1436, 1438.

Both front wall connecting flange 1440 and gripping flange 1442 have widths W"", W""" greater than a width W" of the first continuous elongated profile strip 1436. Second continuous elongated profile strip 1438 has a back wall-connecting flange 1444. In an embodiment, width W' of gripping flange 1442 is about 0.8 centimeters, and width W" of strip 1436 is about 0.3 centimeters. Back wall connecting flange 1444 has a width W''' greater than a width W" of second continuous elongated profile strip 1438. Width W''' of flange 1444 is about 1.7 centimeters in one embodiment, and W" is about 0.3 centimeters. Gripping flange 1442 allows for a user to easily open the interlocked strips 1436, 1438, by grasping flange 1442 and back wall connecting flange 1444 and separating the flanges 1442, 1444. Width W""" of the gripping flange 1442 is preferably substantially less than width W''' of the back wall connecting flange 1444. It is appreciated that the use of these widths facilitates the placement of back wall connecting seal 1448 such that the gripping flange 1442 does not interfere with the sealing process.

To aid in the formation of the airtight and/or watertight seals used in the present disclosure, it is appreciated that the length L of the reclosable fastener 1430 is less than the combined lengths of the two sides 1426, 1428 that form the back panel of bag body 1402. In one embodiment, length L is about 21.5 centimeters.

Back wall connecting flange 1444 is connected to the inside surface 1424 of the rectangular sheet of film 1412 and the back wall 1410 at a back wall connecting seal 1448. Back wall connecting seal 1448 is spaced between profile strips 1436, 1438, and the top seal 1404. In one embodiment of bag 1400, bag 1400 has the various seals placed as follows: Top seal 1404 is located approximately 3 millimeters from the top of bag 1400; Frangible access 1454 is located about 4 millimeters below top seal 104; Back wall connecting seal 1448 is located about 5 millimeters below frangible access 1454; Profiles 1436, 1438 are located about 1.3 centimeters below back wall connecting seal 1448; Front wall connecting flange 1440 is located about 7 millimeters below profiles 1436, 1438; and, Bottom seal 1406 is located about 30 centimeters below front wall connecting flange 1440.

Side seals 1450, 1452 are placed at each end of the reclosable fastener assembly 1430. Side seals 1450, 1452 provide an airtight and/or watertight seal between the inside surface 1424 of film 1412 and reclosable fastener assembly 1430. Each of the side seals 1450, 1452 connects an end 1432, 1434 of the reclosable fastener 1430 to the inside surfaces 1424, 1424' of the rectangular sheet of film 1412 inwardly of the longitudinal folds 1414, 1416 of the bag body 1402 thereby preventing air or liquids from entering or leaving the bag through the ends 1432, 1434 of the reclosable fastener assembly 1430. Preferably, prior to the sealing of front wall connecting flange 1440 to front wall 1408, the ends 1432, 1434 of reclosable fastener 1430 are splotched. Splotching of reclosable fastener ends 1432, 1434 creates substantially flattened ends 1462, 1464 which facilitate the formation of the airtight and/or watertight seals in accordance with the various embodiments.

A frangible access 1454 can be cut between back wall connecting seal 1448 and top seal 1404 with a standard perforating die, and the like, access 1454 is substantially parallel to the reclosable fastener 1430 and exposes reclosable fastener 1430 to a user. Frangible access 1454 is located on the front wall 1408 and on the back wall 1410 of the bag body 1402 adjacent reclosable fastener 1430 and above back wall connecting seal 1448. It is appreciated that upon opening of frangible access 1454, both front wall 1408 and back wall 1410 of bag 1400 are severed. In one embodiment, frangible access 1454 comprises a plurality of perforations 1456.

In one embodiment, first continuous elongated profile strip 1436 and the second continuous elongated profile strip 1438 each have respective back portions 1458, 1460 thereof. By providing the seals 1446, 1448 as illustrated in the figures, first continuous elongated profile strip back portion 1458 can move in relation to the inside surface 1424' of the rectangular sheet of film 1412. It is further appreciated that the seal placement permits second continuous elongated profile strip back portion 1460 to move in relation to the inside surface 1424 of the rectangular sheet of film 1412.

The gripping flange 1442 may include a continuous rib 1466 located at a distal end 1468 of the gripping flange 1442. Gripping flange 1442 can also include a plurality of continuous, substantially parallel ribs 1470 located on the gripping flange 1442.

It is appreciated that reclosable fastener assembly 1430 can take many forms. The gripping flange 1442 and front wall connecting flange 1440 may be made from a single, extruded, flexible polymeric material. That is, gripping flange 1442 and connecting flange 1440 and profile strip 1436 are extruded and form a continuous member. Similarly, second continuous profile strip 1438 and the back wall-connecting flange 1444 are formed from an extruded, flexible polymeric material, and are extruded such that they form a single continuous member. It is appreciated that back wall connecting flange 1444 and front wall connecting flange 1440 are of a sufficient thickness to seal to the respective walls that they connect to, yet of a sufficient thickness not to seal to the inside surface 1424 of walls 1408, 1410 that they are not to seal to when a predetermined amount of heat, pressure and dwell time are applied. A sufficient thickness is empirically determined depending on the type of film 1412 used and the type of polymeric material used for profile strips 1436,1438, and flanges 1440, 1444.

In a variant of the embodiments, gripping flange 1442 and the bag wall-connecting flange are made from a single web. First continuous profile strip 1436 is sealed to the web with an airtight and/or watertight seal (not shown). Similarly, strip 1438 can be sealed to a second web.

A method of making a reclosable back-seam bag 1400 is also provided herein. A rectangular sheet of polymeric material 1412 having an inside surface 1424 is provided in a substantially flat state. A predetermined length L of a reclosable fastener 1430 including two ends 1432, 1434, a first continuous elongated profile strip 1436 and a second continuous elongated profile strip 1438 is cut from a longer length (e.g., a continuous roll of interlocked fastener assemblies). First continuous elongated profile strip 1436 is releasably connected to second continuous elongated profile strip 1438. For each length L of fastener 1430, ends 1432 and 1434 are splotched so that they are substantially flattened.

The reclosable fastener 1430 is moved onto film 1412 transverse to the length of the film 1412 in one variant of the embodiments, or longitudinally across the length of the film 1412 in another variant of the embodiments. Front wall connecting flange 1440 is sealed with an airtight and/or watertight seal to the inside surface 1424' of the rectangular sheet of film 1412 such that it is approximately centered thereon in relation to the width of the sheet of film 1412. Bag body 1402 is formed on a conventional form, fill, and seal machine. Bag body 1402 is formed into a tube (not shown) such that a front wall 1408 and a back wall 1410 are formed. Back wall 1410 is formed by folding the rectangular sheet of film 1412 along two longitudinal folds 1414, 1416, and overlapping and sealing edges 1418, 1420 of the rectangular sheet of film 1412. Back wall 1410 has two sides 1426, 1248. Each side 1426, 1428 is defined between back seam 1422 and a respective one of the longitudinal folds 1414, 1416. After the film is formed into a tube (not shown), front wall 1408 is joined to the back wall 1410 at a bottom seal 1406. Bottom seal 1406 is made in conventional heat sealing jaws (not shown).

Back wall connecting flange 1444 is connected (e.g. by heat sealing) to the inside surface 1424 of rectangular sheet 1412 at what is now the back wall 1410 of bag body 1402 at back wall connecting seal 1448. The method also includes sealing each end 1432, 1434 of the reclosable fastener 1430 to the inside surfaces 1424, 1424' of the rectangular sheet of film 1412 inwardly of the longitudinal folds 1414, 1416 of the bag body 1402 thereby preventing air or liquids from entering or leaving the bag through the ends 1432, 1434 of the reclosable fastener 1430.

The method further includes providing frangible access 1454 substantially parallel to the reclosable fastener 1430 for exposing releasable fastener 1430. Access 1454 is formed with a conventional perforating die, and is located on front wall 1408 and on back wall 1410 of the bag body 1402 adjacent the reclosable fastener assembly 1430 and above the back wall connecting seal 1448.

Figure 18:
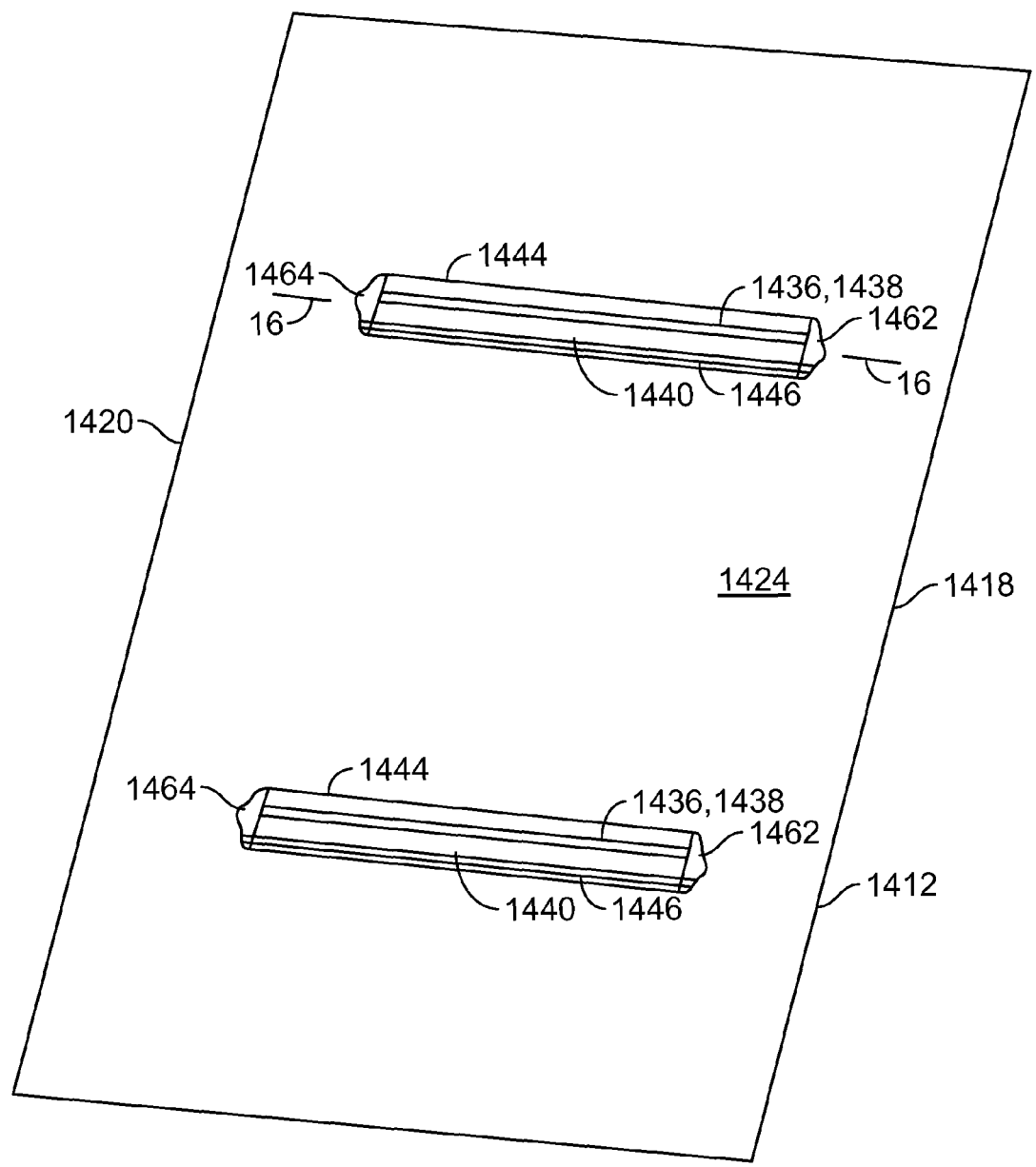

The method then includes providing top seal 1404 above the frangible access 1454. Properly feeding, locating and sealing reclosable fastener 1430 at predetermined locations on rectangular sheet of film 1412 readily are important aspects of the method. Rectangular sheet of film 1412 has marks 3 or other machine readable indicia thereon to permit an electric eye or other sensor to read the marks or indicia so that proper registration and alignment of the recloseable fastener 1430 is obtained with the bag body. Machines commercially available from Z-Patch, Inc. of Carbondale, Ill. are reliable and capable of repeatedly performing the steps referred to in the method described above with high throughput and with low cycle times. The film as shown in FIG. 18 made by the Z-Patch machine is then fed into a form fill seal machine (not shown), having sealing heads adapted to make seals 1404, 1406, 1450, 1452, 1422, and other seals referred to herein. The manner in which reclosable fastener 1430 is fed and positioned for sealing onto rectangular sheet of film 1412 is critical in order to achieve repeatability.

Reclosable fastener 1430, which is generally about 3.5 centimeters wide, in one variant of the embodiments, is delivered in a cross web, stretched position, assuring squareness for positioning onto rectangular sheet of film 1412. It is appreciated that the width and length of fastener 1430 can be such that it accommodates the size of the bag body. The front wall seal 1446 is transverse to film 1412.

Figure 19:
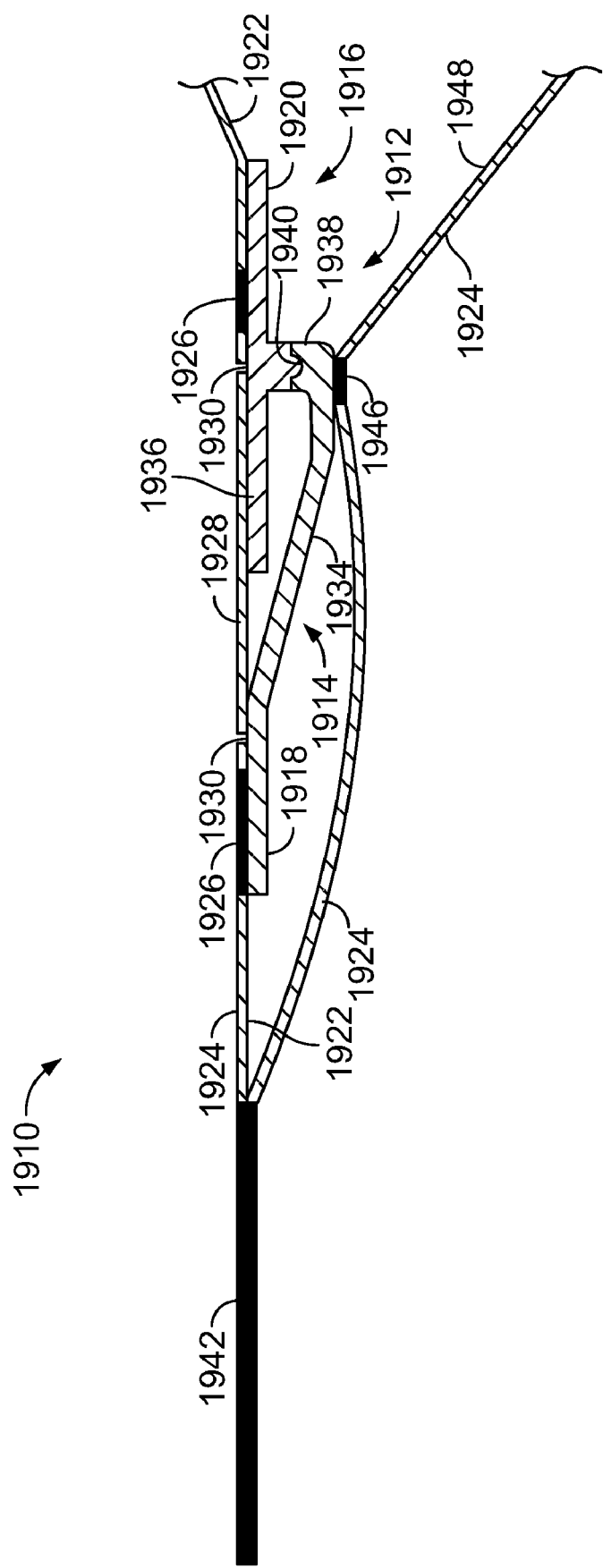
FIG. 19 is a side elevation showing a segment of a container, in accordance with an embodiment, with the fastener attached to the inside of a segment of the flexible material at least partially forming a reclosable container.

FIG. 19 provides a side elevation view showing a segment of a container, in accordance with an embodiment, with the fastener attached to the inside of a segment of the flexible material at least partially forming a reclosable container. Such a container is described in U.S. Pat. No. 5,601,368 which is incorporated herein. FIG. 19 illustrates a tamper-evident container which is generally indicated as 1910'. As shown in the view of FIG. 19, container 1910' further comprises a tack seal 1946 to bond second segment 1934 to inside surface 1948 of flexible material 1924' forming the opposite side of container 1910'. Such a construction virtually eliminates any probability of material contained within container 1910' becoming wedged or caught in the gap otherwise present between second segment 1934 and flexible material 1924'.

A method for attaching fastener 1912 to the flexible material 1924, for providing a tamper-evident reclosable opening therethrough, begins with selection of a segment of flexible material 1924, which is selected for forming a container 1910. A plurality of cuts comprising perforations 1930 and at least one slit 1932 are made to define a removable portion 1928. Next, a reclosable zipper-type fastener 1912 is selected and cut to a predetermined length sufficient to overlie the removable portion 1928. Opposed distal ends of fastener 1912 are then "splotched" and the splotched length of fastener is disposed in adjacent, overlying relation to removable portion 1928. The perimeter seal 1926 is formed by the application of pressure and heat. If desired, tack seal 1946 would be made in a subsequent step. From that point on, the container would be formed and filled using the form and fill apparatus and methods that were described above. No further manipulation of fastener 1912 and its related removable portion 1928 is required.

While only a few embodiments have been described hereinabove, those of ordinary skill in the art will recognize that the embodiments may be modified and altered without departing from the central spirit and scope of the disclosure and appended claims. Thus, the various embodiments described hereinabove are to be considered in all respects as illustrative and not restrictive, the scope of the inventive subject matter being indicated by the appended claims, rather than by the foregoing description, and all changes which come within the meaning and range of equivalency of the claims are intended to be embraced herein.

It will thus be seen that the objects set forth above, among those made apparent from the preceding description, are efficiently attained, and, since certain changes may be made in the above construction without departing from the scope of the disclosure, it is intended that all matter contained in the above description or shown in the accompanying drawings shall be interpreted as illustrative and not in a limiting sense.

It is also to be understood that the following claims are intended to cover all of the generic and specific features of the disclosure herein described, and all statements of the scope of the disclosure which, as a matter of language, might be said to fall therebetween.

What is claimed is:

1. An apparatus for attaching a reclosable zipper-type fastener to a flexible material primarily intended for use with a host form, fill, seal and separate packaging machine to form a top-opening reclosable container, said apparatus comprising:
    a means for supplying a flexible material to said apparatus;
    a programmable motor and a function controller operatively connected to each other for driving said apparatus;
    means for guiding said flexible material along a first path through said apparatus;
    a means for supplying a plurality of reclosable zipper-type fasteners to said apparatus, each one of said plurality having fused opposed distal ends and being joined to an adjacent one of said plurality at said fused opposed distal ends;
    means for guiding said fasteners along a second path through said apparatus;
    means for making at least one cut between said fasteners to produce individual ones of said fasteners;
    means for transferring individual ones of said fasteners from said second path to a position substantially adjacent said first path, said means for transferring being disposed along said second path and being driven by said motor;
    means for sealing said one fastener to said flexible material in overlying relation to said cut in response to a signal received from said controller;
    means for sealing said zipper tape to both a front wall and a back wall of said container so as to form a top seal at the top of each of said containers;
    and means for horizontally perforating said film above said zipper tape in said container and below said top seal;
    wherein said means for transferring is disposed along said second path downstream from said pusher and comprises a separator for detaching an individual one of said fused fastener strips from said supply of fasteners and a transfer drum including a perimeter surface having at least one detached strip receiver formed on said surface and being disposed in receiving relation to said detached fused fastener strip.

2. An apparatus as in claim 1 wherein each one of said fasteners is formed from said zipper tape and has a perimeter and fastener distal ends, each said one fastener comprising a pair of mating, reclosable sealing strips, one of said strips comprising a male fastener part and the other of said strips comprising a female fastener part, said male and female parts being joined to each other and said fastener distal ends being fused to thereby define a fused fastener strip.

3. An apparatus as in claim 2 wherein adjacent ones of said fused fasteners strips are joined together at said fused ends to provide a supply of said reclosable zipper-type fasteners that move along said second path with said sealing strips disposed in substantially transverse relation to the direction of said second path.

4. An apparatus as in claim 1 wherein said supply of reclosable zipper-type fasteners comprises a roll.

5. An apparatus as in claim 1 wherein said means for guiding said fasteners comprises a pusher for engaging an individual one of said fused fastener strips and indexing said fasteners along said second path seriatim in response to a signal received from said controller.

6. An apparatus as in claim 1 wherein said transfer drum comprises a plurality of said detached strip receivers formed on said surface.

7. An apparatus as in claim 6 wherein said transfer drum further comprises means for retaining said strip in said receiver.

8. An apparatus as in claim 7 wherein said transfer drum further comprises means for positioning each of said detached strip retainers, seriatim, adjacent said first path in said juxtaposed relation to said cut and for releasing said detached strip therefrom, whereby said sealing means may attach said detached strip to said flexible material.

9. An apparatus as in claim 8 further comprising a web position detector disposed along said first path and operatively connected to said controller that upon detection of movement of said flexible material controls the travel of said flexible material along said first path, controls the travel of said zipper-type fasteners along said second path, and controls said means for sealing, all through said controller.

10. An apparatus as in claim 9 wherein said flexible material includes a surface having indicia disposed along said surface at predetermined intervals, said web position detector comprising optical means for sensing said indicia.

* * * * *